United States Patent [19]
Methlie et al.

[11] Patent Number: 4,998,232
[45] Date of Patent: Mar. 5, 1991

[54] OPTICAL DISK HANDLING APPARATUS WITH FLIP LATCH

[75] Inventors: Jennifer L. Methlie; Thomas C. Oliver; Donald J. Stavely; Mark E. Wanger, all of Fort Collins, Colo.

[73] Assignee: Hewlett-Packard Company, Palo Alto, Calif.

[21] Appl. No.: 278,102

[22] Filed: Nov. 30, 1988

[51] Int. Cl.⁵ .............................................. G11B 5/48
[52] U.S. Cl. ....................................... 369/36; 369/34; 369/39
[58] Field of Search .................... 369/34, 35, 36, 37, 369/38

[56] References Cited

U.S. PATENT DOCUMENTS

| | | |
|---|---|---|
| 4,135,245 | 1/1979 | Kemplin et al. |
| 4,417,258 | 11/1983 | Tribolet et al. |
| 4,573,129 | 2/1986 | Tribolet et al. |
| 4,608,679 | 8/1986 | Rudy et al. ................... 369/34 X |
| 4,786,995 | 11/1988 | Stupeck et al. ................... 369/36 |
| 4,787,074 | 11/1988 | Deck et al. ................... 369/36 X |
| 4,817,071 | 3/1989 | Carlson et al. ................... 369/36 |

*Primary Examiner*—Stuart S. Levy
*Assistant Examiner*—Kenneth B. Wells

[57] ABSTRACT

An optical disk handling apparatus for producing controlled linear and rotational displacement of an optical disk received therein comprising: a base member; a guide assembly; a shaft for rotatably mounting the guide assembly on the base member; an optical disk holding assembly received by the guide assembly in linearly forwardly and rearwardly displaceable, rotationally nondisplaceable relationship therewith; a reversible drive motor; a linear displacement assembly for producing relative linear displacement between the guide assembly and the holding assembly; a transmission assembly for transmitting torque from the drive for producing rotational displacement of the guide assembly and linear displacement of the holding assembly; projection members projecting rearwardly from the guide assembly rear end for coacting with a latch assembly; axially extendable and retractable plunger members operatively associated with the optical disk holding assembly and projectable relative the rear end of the guide assembly for coacting with the latch assembly; a latch assembly mounted on the base member for latchingly engaging a projection member during rotation of the guide assembly and for coacting with a plunger member for disengaging the projection member from the latch assembly for enabling rotation of the guide assembly; and a restraining structure operatively associated with the holding assembly for restraining linear displacement thereof.

67 Claims, 10 Drawing Sheets

4,998,232

OPTICAL DISK HANDLING APPARATUS WITH FLIP LATCH

BACKGROUND OF THE INVENTION

The present invention relates generally to an apparatus for handling optical disks of the type which are readable on both a first side and a second side thereof and, more particularly, to an optical disk handling system having the capability of flipping an optical disk and linearly displacing an optical disk.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disk reading devices generally receive a disk which is to be read through a narrow slot provided on the front surface of the device. Most optical disk reading devices contain a single reading head. The surface of an optical disk which is to be read must be positioned adjacent to the reading head. Thus, before loading an optical disk which is written on both sides it may be necessary to first flip the disk in order to position the desired side of the disk adjacent to the reading head.

Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk in an optical disk reader with the appropriate side of the disk positioned in readable relationship with the reader. In a disk storage system wherein the disks are stored in a two-dimensional array consisting of vertically extending columns and horizontally extending rows, it will be necessary for a disk handling system to engage and move each disk vertically, laterally, and longitudinally in order to remove it from storage and insert it into a disk reader. It may also be necessary for the disk handling system to flip the disk to reverse the side thereof which will be positioned in readable relationship with a reader.

In order to decrease the cost and increase the reliability of such a disk handling system, it is generally desirable to reduce the number of separate drive units to a minimum. It is also desirable to minimize or eliminate the type of mechanical systems such as, for example, clutch assemblies, which are particularly subject to malfunction under frequent use conditions. It is also desirable to minimize the use of sensing devices which are particularly subject to malfunction such as, for example, photoelectric or magnetic proximity sensors. It is also desirable to minimize the use of sensors on moving system components to eliminate problems associated with moving lead wires, etc.

SUMMARY OF THE INVENTION

The present invention is directed to an optical disk handling apparatus which may be a sub-assembly of a larger optical disk handling system. The optical disk handling apparatus is capable of producing forward and rearward longitudinal displacement of an engaged optical disk enabling it, for example, to remove an optical disk from a longitudinally extending storage unit or to insert a disk in a disk reader. The apparatus is also capable of flipping an optical disk from one side to the other so as to enable the positioning of either side of the optical disk in readable relationship with a reading head of an optical disk reading device.

The optical disk handling apparatus receives operating torque from a single, stationarily mounted, reversible torque drive unit. Feedback signals which are used to change the mode of operation of the handling apparatus may be provided by a reliable motor encoder unit and displacement sensing software. This use of such a motor rotational displacement sensor eliminates the need for less reliable proximity sensors and the like and also eliminates the need for mounting of any sensors whatsoever on moving system components.

The handling apparatus has relatively simple transmission components which are always engaged with one another. Complex and unreliable clutch assemblies have been eliminated.

The mechanisms used to convert motion from linear displacement to flipping, rotational displacement include stop and latch devices which directly engage a linearly moving assembly and a rotating assembly.

The invention may comprise a displacement apparatus for producing controlled linear and rotational displacement of an object received therein comprising: a) base means for supporting various components of said displacement apparatus thereon; b) guide moans for guiding the movement of an object holding means, said guide means comprising a forward end, a rear end, and a central longitudinal axis extending between said forward end and said rear end, and being rotatable in a first direction and a second direction about said central longitudinal axis; c) shaft means for rotatably mounting said guide means on said base means, said shaft means comprising a first end fixedly attached to said rear end of said guide means, a second end rotatably received in said base means, and a central longitudinal axis extending in coaxial relationship with said central longitudinal axis of said guide means whereby said guide means is rotatable about said central longitudinal axis thereof through rotation of said shaft means; d) object holding means for engaging an object and holding said object in relatively stationary relationship therewith; said object holding means being received by said guide means in linearly displaceable, rotationally nondisplaceable relationship therewith, said object holding means being forwardly and rearwardly displaceable relative said guide means; e) drive means for providing reversible driving torque to a transmission means; f) linear displacement means for producing relative linear displacement between said guide means and said holding means in response to torque applied thereto; g) transmission means for transmitting torque from said drive means for producing rotational displacement of said guide means and linear displacement of said holding means; said transmission means having a first operating mode wherein torque applied thereto by said drive means in a first direction is transmitted to said guide means for rotating said guide means and said holding means in said first direction of rotation about said central longitudinal axis of said guide means; said transmission means having a second operating mode wherein torque applied thereto by said drive means in a second direction is transmitted to said linear displacement means for producing forward linear displacement of said holding means relative said guide means; and said transmission means having a third operating mode wherein torque applied thereto by said drive means in said first direction is transmitted to said linear displacement means for producing rearward linear displacement of said holding means relative said guide means; h) projection means projecting rearwardly from said guide means rear end for coacting with a latch means, said projection means being moved in a circular travel path by rotation of said guide means; i) plunger means operatively associated with said object holding means and projectable relative said rear end of said guide means for coacting with said latch means, said plunger means having a rearwardly extended position and a forwardly retracted position; j) latch means mounted on said base means for engaging said projection means during rotation of said guide means in said first direction of rotation for terminating rotation of said guide means and for restraining said guide means from further rotation in said first direction and said second direction and for coacting with said plunger means for disengaging said projection means from said latch means for enabling rotation of said guide means in said first direction of rotation; and k) restraining means operatively associated with said holding means for restraining linear displacement thereof.

The invention may also comprise a rotatable member and latching assembly comprising: a) a rotatable member having a forward end, a rear end, and a longitudinally extending axis of rotation and being rotatable in a first direction and a second direction about said axis of rotation; b) fixed projection means projecting rearwardly from said rotatable member and positioned in radially displaced relationship from said central axis of rotation for coacting with a latch means, said projection means being displaceable in a circular travel path through rotation of said rotatable member; c) axially extendable and retractable plunger means positioned radially proximate said projection means and having a rearwardly extended position and a forwardly retracted position relative said rear end of said rotatable member for coacting with said latch means; and d) latch means positioned rearwardly of said rotatable member at a fixed radial and circumferential position relative said rotatable member central axis of rotation for engaging said projection means during rotation of said rotatable member in said first rotation direction and for terminating said rotation in said first direction and for restraining rotation of said rotatable member in said first direction and said second direction during engagement with said projection means; and for coacting with said plunger means subsequent to engagement with said projection means for releasing said projection means from engagement with said latch means for permitting rotation of said rotatable member in said first direction while preventing rotation thereof in said second direction.

The invention may also comprise an optical disk handling apparatus for producing controlled linear and rotational displacement of an optical disk received therein comprising: a) base means for supporting various components of said apparatus thereon; b) guide means for guiding the movement of an optical disk holding means, said guide means comprising a forward end, a rear end, and a central longitudinal axis extending between said forward end and said rear end, and being rotatable in a first direction and a second direction about said central longitudinal axis; c) shaft means for rotatably mounting said guide means on said base means, said shaft means comprising a first end fixedly attached to said rear end of said guide means, a second end rotatably received in said base means, and a central longitudinal axis extending in coaxial relationship with said central longitudinal axis of said guide means whereby said guide means is rotatable about said central longitudinal axis thereof through rotation of said shaft means; d) optical disk holding means for engaging an optical disk and holding said optical disk in relatively stationary relationship therewith; said optical disk holding means being received by said guide means in linearly displaceable, rotationally nondisplaceable relationship therewith, said optical disk holding means being forwardly and rearwardly displaceable relative said guide means; e) drive means for providing reversible driving torque to a transmission means; f) linear displacement means for producing relative linear displacement between said guide means and said holding means in response to torque applied thereto; g) transmission means for transmitting torque from said drive means for producing rotational displacement of said guide means and linear displacement of said holding means; said transmission means having a first operating mode wherein torque applied thereto by said drive means in a first direction is transmitted to said guide means for rotating said guide means and said holding means in said first direction of rotation about said central longitudinal axis of said guide means; said transmission means having a second operating mode wherein torque applied thereto by said drive means in a second direction is transmitted to said linear displacement means for producing forward linear displacement of said holding means relative said guide means; and said transmission means having a third operating mode wherein torque applied thereto by said drive means in said first direction is transmitted to said linear displacement means for producing rearward linear displacement of said holding means relative said guide means; h) projection means projecting rearwardly from said guide means rear end for coacting with a latch means, said projection means being moved in a circular travel path by rotation of said guide means; i) plunger means operatively associated with said optical disk holding means and projectable relative said rear end of said guide means for coacting with said latch means, said plunger means having a rearwardly extended position and a forwardly retracted position; j) latch means mounted on said base means for engaging said projection means during rotation of said guide means in said first direction of rotation for terminating rotation of said guide means and for restraining said guide means from further rotation in said first direction and said second direction and for coacting with said plunger means for disengaging said projection means from said latch means for enabling rotation of said guide means in said first direction of rotation; and k) restraining means operatively associated with said holding means for restraining linear displacement thereof.

BRIEF DESCRIPTION OF THE DRAWINGS

An illustrative and presently preferred embodiment of the invention is shown in the accompanying drawings in which.

DETAILED DESCRIPTION OF PREFERRED EMBODIMENTS OF THE INVENTION

The Apparatus in General

Figure 1:
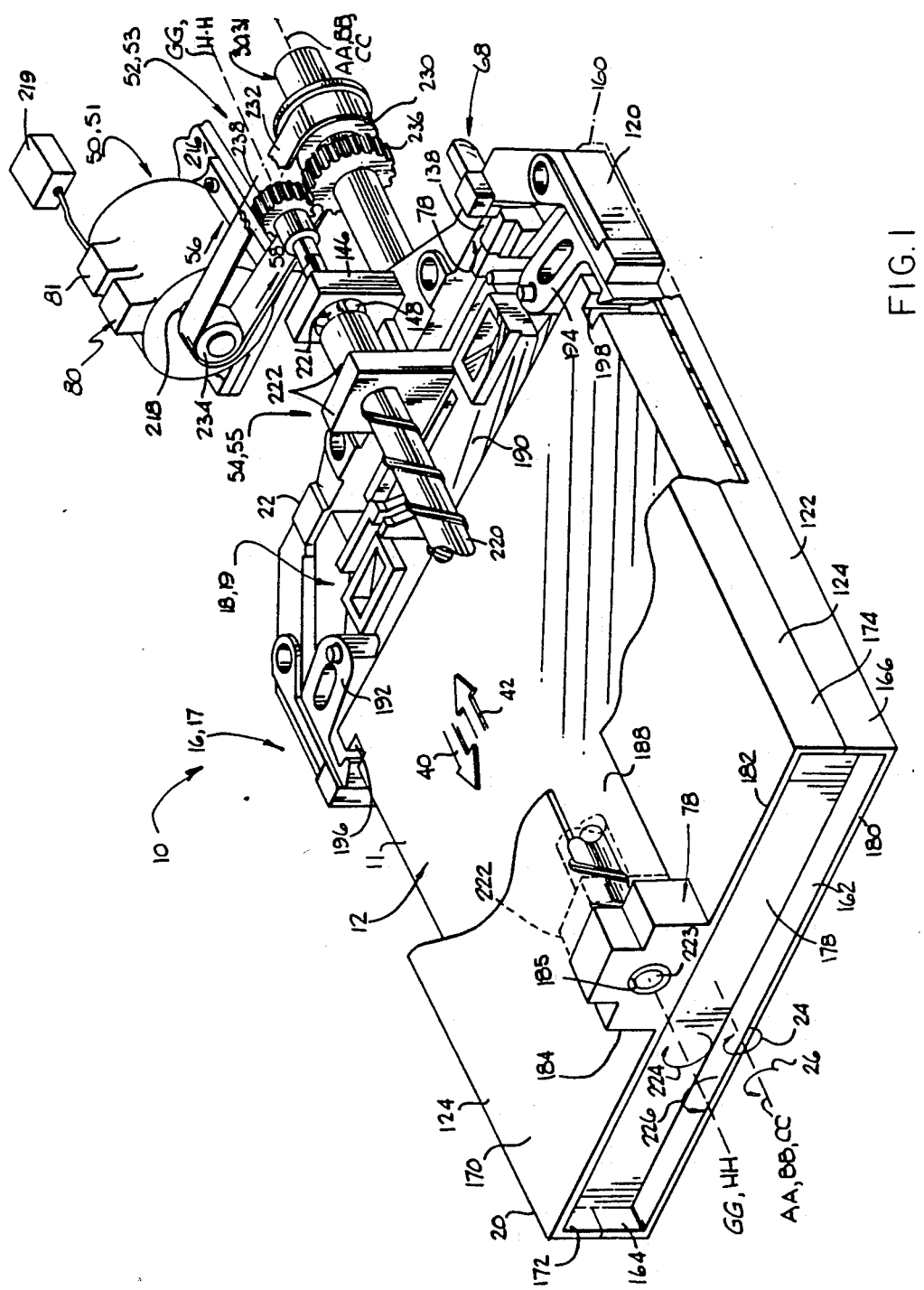
FIG. 1 is a perspective view of a forward portion of an optical disk handling apparatus.
Figure 2:
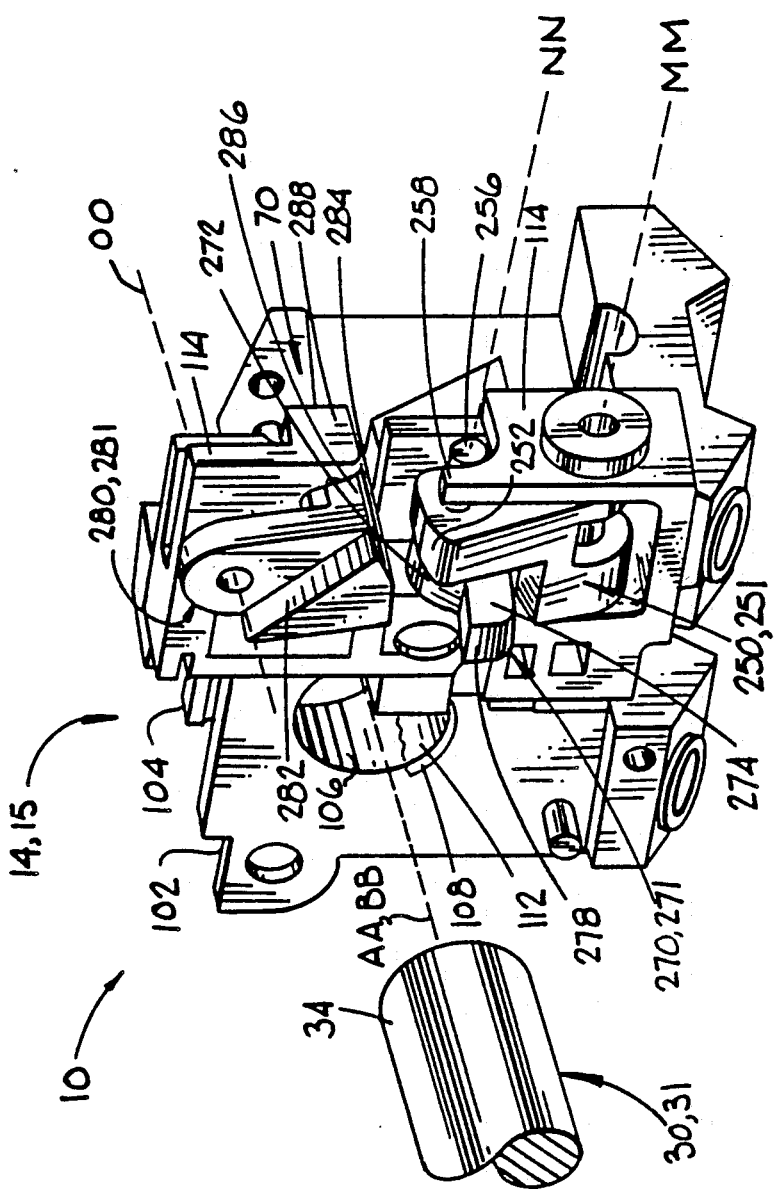
FIG. 2 is a perspective view of a rear portion of an optical disk handling apparatus.

FIGS. 1 and 2 illustrate an optical disk handling apparatus 10 which may be used for producing controlled linear and rotational displacement of an optical disk cartridge 12 which is received in the apparatus. The optical disk cartridge 12 may be of the type containing an optical disk which has information encoded on both surfaces thereof. The cartridge 12 may thus have a generally rectangular top surface 11, FIG. 1, and an identically shaped bottom surface 13, FIG. IA, which are each adapted to be positioned adjacent to a reading head (not shown) for reading the information contained on the associated disk.

The apparatus comprises a base means 14 such as block 15, FIG. 2, for supporting various components of the apparatus 10.

A guide means 10, such as sleeve assembly 17, FIG. 1, is provided for guiding the movement of an optical disk holding means 18. The guide means has a forward end 20, a rear end 22 and a central longitudinal axis AA extending between the forward end and rear end. The guide means 16 is rotatable in a first direction 24 and a second direction 26 about central longitudinal axis AA.

The optical disk handling apparatus 10 comprises a shaft means 30 for rotatably mounting the guide means 16 on the base means 14, FIG. 2. The shaft means, which may comprise a cylindrical steel shaft 31, has a forward end 32 fixedly attached to the rear end 22 of the guide means 16, FIG. 6. The shaft means has a second end 34, FIG. 2, which is rotatably received in the base means 14. The shaft means 30 has a central longitudinal axis BB which extends in coaxial relationship with the central longitudinal axis AA of the guide means 16. Thus, the guide means 16 is rotatable about the central longitudinal axis AA thereof through the rotation of the shaft means 30 about its central longitudinal axis BB.

The optical disk handling apparatus 10 includes an optical disk holding means 18, such as sliding assembly 19, for engaging an optical disk cartridge 12 and holding the cartridge in relatively stationary relationship therewith. The optical disk holding means 18 is received in the guide means 16 in linearly displaceable, rotationally nondisplaceable relationship therewith. The optical disk holding means 18 is linearly displaceable in a forward direction 40 and in a rearward direction 42 with respect to the guide means 16.

The optical disk handling apparatus includes a drive means 50, such as electric motor 51, for providing reversible driving torque to a transmission means 52.

A linear displacement means 54, such as worm drive assembly 55, is provided for producing relative linear displacement between the guide means 16 and the holding means 18 in response to torque applied thereto The apparatus 10 includes a transmission means 52, such as gear assembly 53, for transmitting torque from the drive means 50 for producing rotational displacement of the guide means 16 and linear displacement of the holding means 18. The transmission means has a first operating mode, FIG. 14, wherein torque applied thereto by the drive means 50 in a first torque direction 56, FIG. 1, is transmitted to the guide means for rotating the guide means 16 and the holding means 18 in the first direction of rotation 24 about the central longitudinal axis AA of the guide means The transmission means 52 has a second operating mode, FIG. 15, wherein torque applied thereto by the drive means 50 in a second torque direction 58, FIG. 1, is transmitted to the linear displacement means 54 for producing forward 40 linear displacement of the holding means 18 relative the guide means 16. The transmission means 52 has a third operating mode, FIG. 16, wherein torque applied thereto by the drive means in the first torque direction 56 is transmitted to the linear displacement means 54 for producing rearward 42 linear displacement of the holding means 18 relative the guide means 16.

Projection means 68, FIGS. 1 and 3, 6 and 7, are provided which project rearwardly from the guide means rear end 22 for coacting with a latch means 70. The projection means 68 are moved through a circular travel path 72, FIGS. 8-10, by rotation of the guide means 16.

Figure 6:
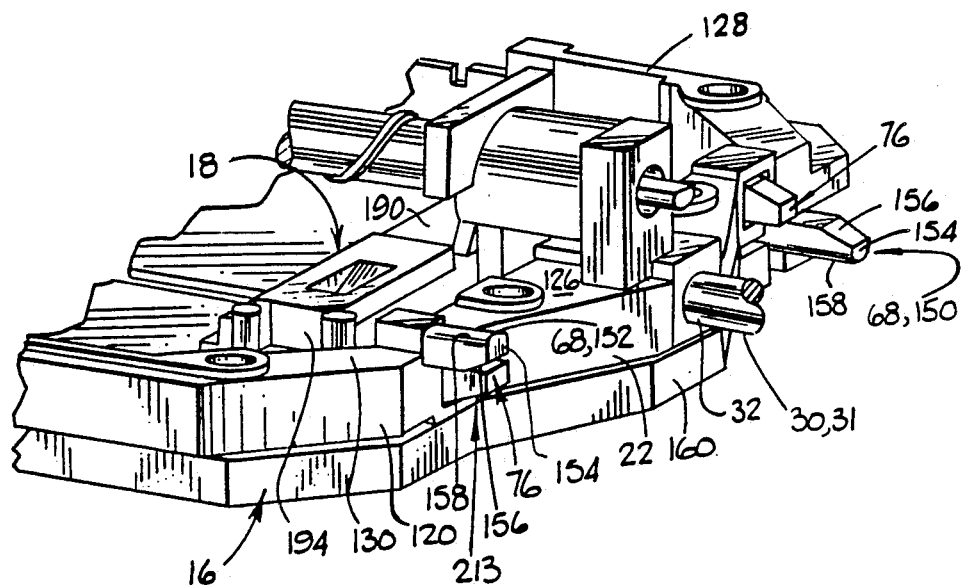
FIG. 6 is a detail view of a portion of an optical disk handling apparatus showing an optical disk holding assembly in a rearwardmost position.
Figure 7:
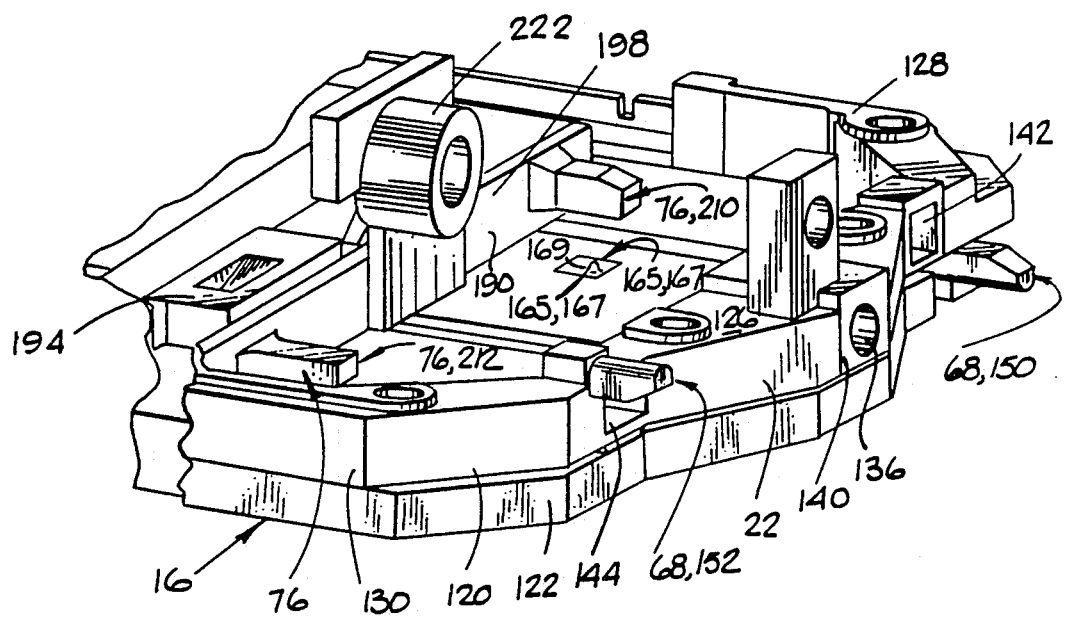
FIG. 7 is a detail view of a portion of an optical disk handling apparatus showing an optical disk holding assembly in a forwardly displaced position.

The apparatus 10 comprises plunger means 76, FIGS. 6 and 7, which are operatively associated with the optical disk holding means 18 and which are projectable relative the rear end 22 of the guide means 16 for coacting with the latch means 70. Plunger means 76 are located in a rearwardmost extended position and move along a circular travel path 77, FIGS. 8-10, during rotation of the guide means 16. The plunger means 76 have a rearwardly extended position, FIG. 6, and a forwardly retracted position, FIG. 7.

Figure 10:
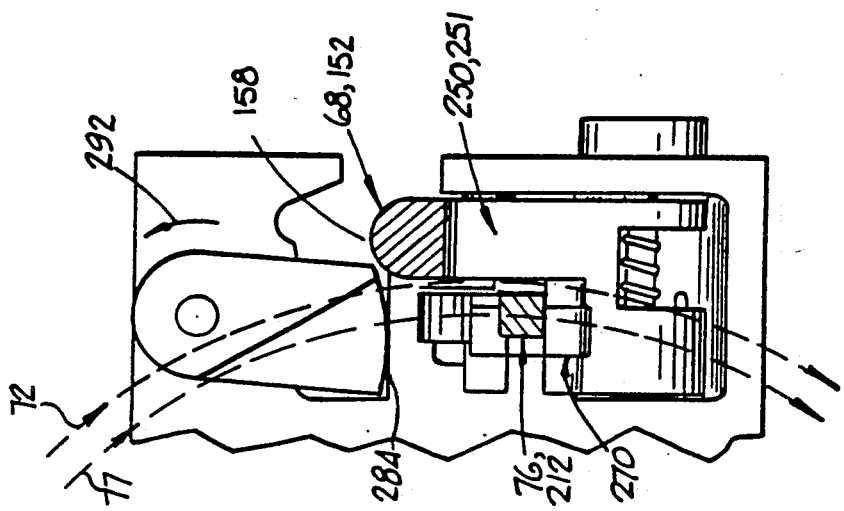
FIGS. 8-10 are rearwardly-facing elevation views of a latch assembly illustrating various operating positions thereof.
Figure 9:
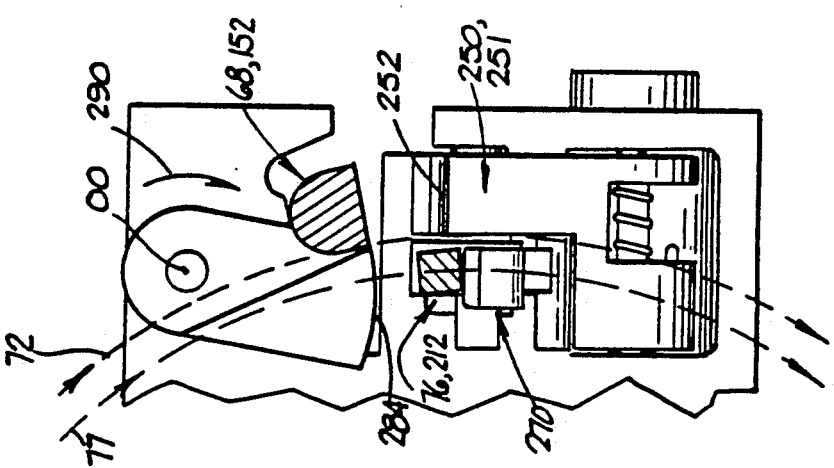
Figure 8:
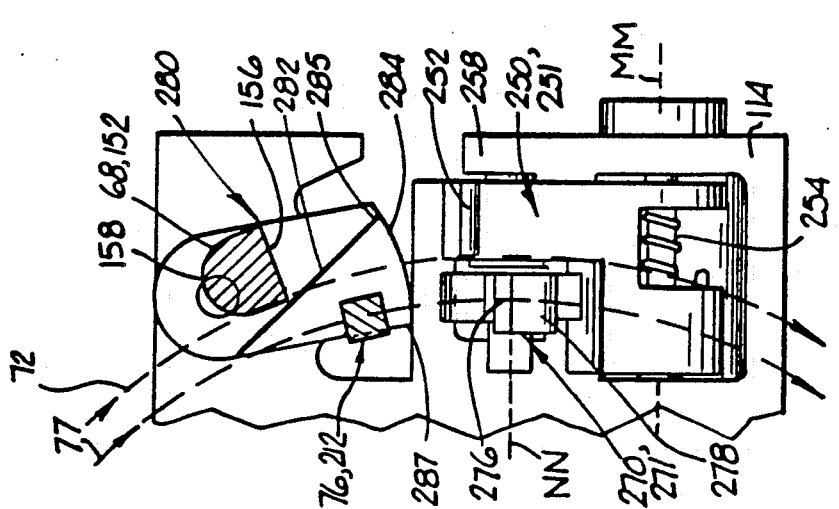

The apparatus comprises a latch means 70, FIG. 2, mounted on the base means 14 for engaging the projection means 68 during rotation of the guide means 16 in the first direction of rotation 24 for terminating rotation of the guide means and for restraining the guide means from further rotation in the first direction 24 and the second direction 26, FIGS. 8-10. The latch means 70 also is adapted to coact with the plunger means 76 for disengaging the projection means 72 from the latch means 70, FIG. 13, for enabling rotation of the guide means 16 in the first direction of rotation 24.

The apparatus 10 also includes restraining means 78 operatively associated with the holding mean 18 for restraining linear displacement of the holding means 18 relative to the guide means 16.

The optical disk handling apparatus 10 may also comprise displacement-sensitive control means 80 for terminating driving torque and for reversing the direction of driving torque provided by the drive means 50 in response to the drive means completing a predetermined angular displacement associated with a predetermined amount of angular displacement of the guide means and/or linear displacement of the holding means This predetermined displacement, which causes termination and reversal of the direction of driving torque, may be programmed to coincide with the engagement of the projection means 68 with the latch means 70 and also with the engagement of the holding means 18 with the restraining means 78.

Having thus described the optical disk handling apparatus 10 in general, various features thereof will now be more fully described.

Base Means

As illustrated in FIG. 2, base means 14 may comprise a block structure 15 having a forward portion 102 and rear portion 104 and having a central longitudinal bore 106 extending therethrough. The central bore 106 may be adapted to accept a bearing assembly 108 therein for enabling rotatable mounting of shaft means 30 within bore 106. Bearing assembly 108 may be a conventional ball bearing assembly having an outer portion (not shown) which is adapted to engage the surface of central bore 10 in tight-fitting, non-movable relationship therewith. The bearing assembly has an inner portion 112 which is rotatably movable with respect to the outer portion. The inner portion is adapted to tightly engage the outer surface of the end portion 32 of shaft 30 and hold it in radially and circumferentially non-movable relationship therewith such that the shaft 30 is freely rotatable relative the block 15. The base means 14 may also comprise a bracket assembly 114 which is mounted on the forward portion 102 of block 15 and which is adapted to support various components of the latch means 70 as described in further detail hereinafter.

Guide Means and Projection Means

Guide means 16 is adapted for receiving a cartridge holding means 18 therein and for limiting the direction of movement of the holding means to a forward direction 40 and a rearward direction 42. The guide means, in one preferred embodiment, comprises a sleeve assembly 17 which is constructed from a yoke member 120, a lower, generally U-shaped channel member 122, and an upper, generally U-shaped channel member 124 which in one preferred embodiment is identical to member 122. As illustrated in FIGS. 1 and 3–7, the yoke member 120 is an elongate generally radially extending member having a radially extending central body portion 126 and a two radially outwardly and forwardly projecting arm portions 128, 130 which are integrally formed with the central body portion 126. The yoke member has a generally flat top surface 132, FIG. 5, and a generally flat bottom surface 134, FIG. 3. The yoke central body portion has a centrally located circular bore 136 extending between a planar forward wall portion 138 and a planar rear wall portion 140 thereof, FIGS. 3 and 7. Circular bore 136 has a central longitudinal axis CC which is adapted to be positioned coaxially with shaft axis BB. Bore 136 is adapted to receive a forward end portion 32 of shaft 30 in fixed relationship therewithin, i.e., shaft 30 is not rotatable within bore 136.

Figure 5:
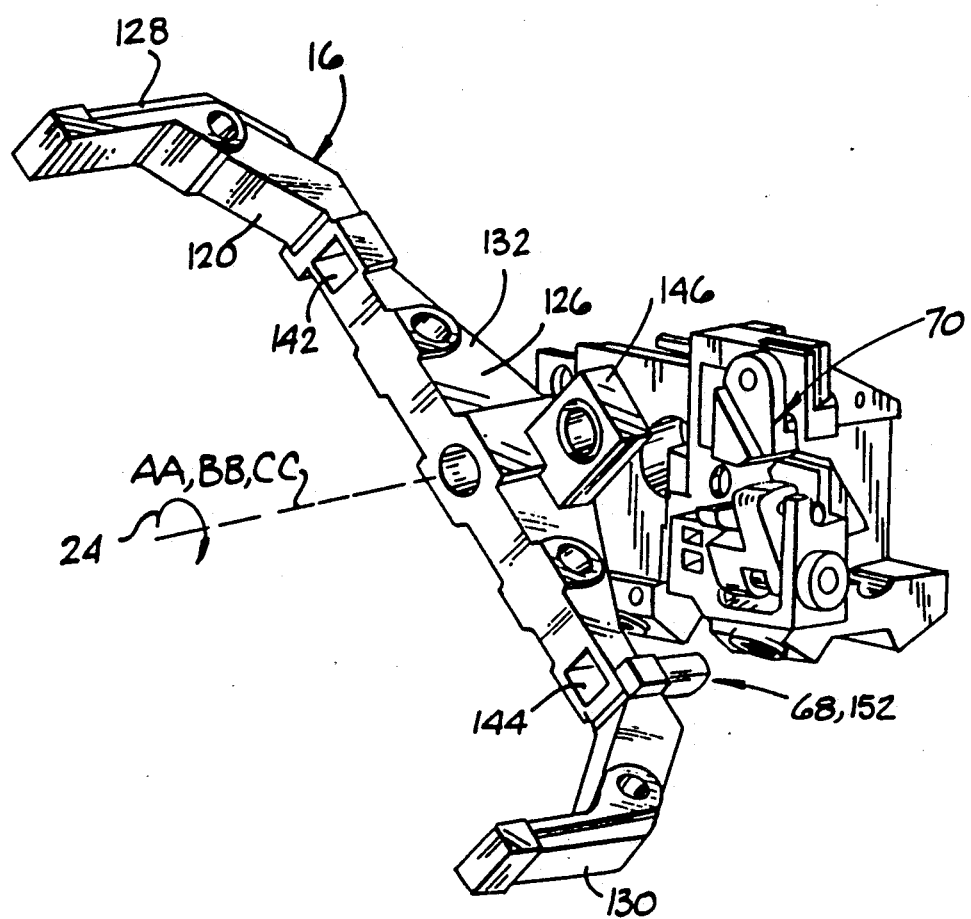

The yoke central body portion 126 has a pair of radially outwardly positioned bores 142, 144 extending axially therethrough, FIGS. 5 and 7. The axial dimension of each bore may be, e.g., 0.3 inches In one preferred embodiment, these bores each have identical square cross-sectional configurations which may be, e.g., 0.3 inches on each side. The bores 142, 144 are positioned in diametrically opposite relationship with one another and are each located at the same radial distance, e.g. 1.7 inches, from the center line of bore 136. Bores 142, 144 are adapted to enable plunger means 76 to move axially therethrough as discussed in further detail below.

The yoke central body portion has a worm drive mounting stud 146 integrally formed therewith and projecting upwardly from the upper surface 132 thereof. The worm drive mounting stud has a circular bore 148 extending therethrough which has a central longitudinal axis GG positioned parallel to the central body circular bore axis CC. Axis GG may e both vertically and laterally displaced from axis CC, e.g. vertically displaced 0.7 inches and axially displaced 0.2 inches.

Projection means 68 are fixedly mounted at opposite ends of the yoke central body portion 126 and project axially rearwardly therefrom The projection means 16 include a first projection member 150 positioned near bore 142 and a second projection member 152 positioned near bore 144, FIGS. 1 and 3–7. The projection members 150, 152 are positioned diametrically oppositely relative central bore axis CC with projection member 150 being positioned below bore 142 and projection member 152 positioned above bore 144. Each projection member 150, 152 extends axially rearwardly the same distance, e.g. 0.4 inches, from the rear surface of the yoke upon which it is mounted. Each of the axially extending members 150, 152 may terminate in a flat radially extending surface 154, FIG. 6. Each projection member 150, 152 comprises an axially and transversely extending, planar, tapering surface 156, FIGS. 6, 8 and 11, which is adapted to make initial contact with the latch means 70 during rotation of the guide means in rotation direction 24. Each projection member 150, 152 also has a rounded surface 158 which is adapted to be engaged by the latch means 70 to prevent rotation of the guide means in direction 26. The projection members 150, 152 are fixedly attached to the yoke member and may be integrally formed therewith. The projection members are equally radially displaced, e.g., 2.0 inches from the central longitudinal axis AA of the guide means, and are adapted to make contact with predetermined portions of the latch means as described in further detail below.

Figure 3:
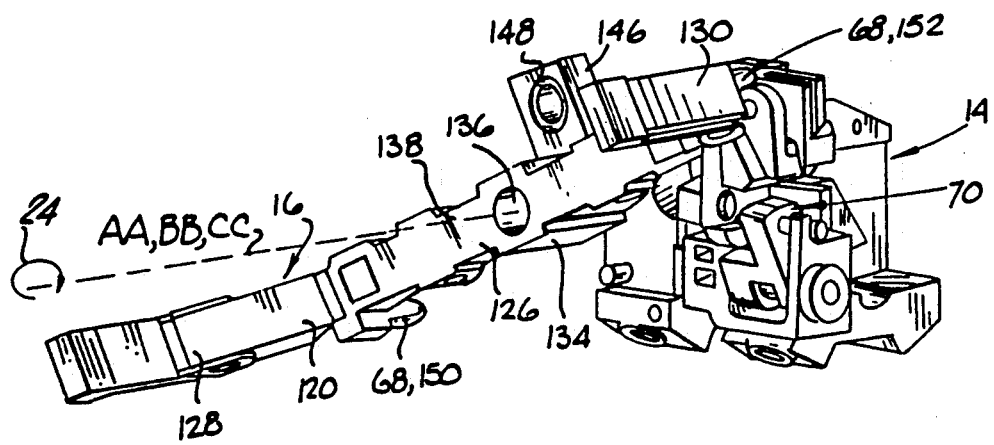
FIGS. 3-5 are partial views of an optical disk handling apparatus illustrating relative rotated positions of a guide assembly with respect to a latch assembly.

As illustrated in FIG. 1, lower U-shaped channel member 122 is fixedly attached at a rear portion 160 thereof to the flat bottom surface 134, FIG. 3, of the yoke member 120 by conventional attachment means such as attachment screws (not shown). The lower channel member 122 may comprise a generally flat longitudinally and laterally extending main body portion 162 and upwardly projecting side wall portions 164, 166. As shown by FIG. 7, a detent means 165 such as an upwardly biased, downwardly deflectable spring metal member 167 having an upwardly projecting rounded portion 169 is mounted above a recessed portion on the upper surface of the main body portion. The rounded portion 169 is adapted to engage a hole (not shown) in a bottom surface of the holding means to provide a detent force which resist forward movement of the holding means from its rearwardmost location, as described in further detail below.

Upper U-shaped channel 124 comprises a rear end portion (not shown) which is fixedly attached to the upper surface portion of the yoke member 120. The upper channel portion 164 comprises a flat main body portion 170 which is adapted to be positioned immediately above the lower channel main body portion 162 The lower channel member 124 also comprises downwardly extending side wall portions 172, 174 which are adapted to be secured at a bottom edge portion thereof to a top edge portion of lower member side wall portion 164, 166, respectively. The upper and lower channel members 122, 124 define a longitudinally extending cavity 178 having a rectangular cross-section which conforms generally to the rectangular cross-sectional shape of an optical disk cartridge 12. The cavity extends from the forward wall portion 138 of the yoke member to a rear rectangular opening defined by the forward edges 180, 182 of the upper and lower channel members. In one preferred embodiment, the distance between yoke forward surface 134 and the forward edge surfaces 180, 182 of the channel members is approximately 0.25 inches greater than the combined axial length of the optical disk holding means 18 and the optical disk 12. The upper U-shaped channel 124 has a worm drive mounting projection 184 fixedly attached thereto and projecting upwardly from the top surface portion 186 thereof. The worm drive's support block 184 has a bore 185 extending therethrough having a central longitudinal axis HH which is coaxial with axis GG extending through the worm drive mounting stud 146. The upper channel main body portion 170 has a longitudinally extending opening 188 therein which enables longitudinal displacement of a worm drive slide member 222 as discussed in further detail below.

Optical Disc Holding Means and Plunger Means

Figure 1A:
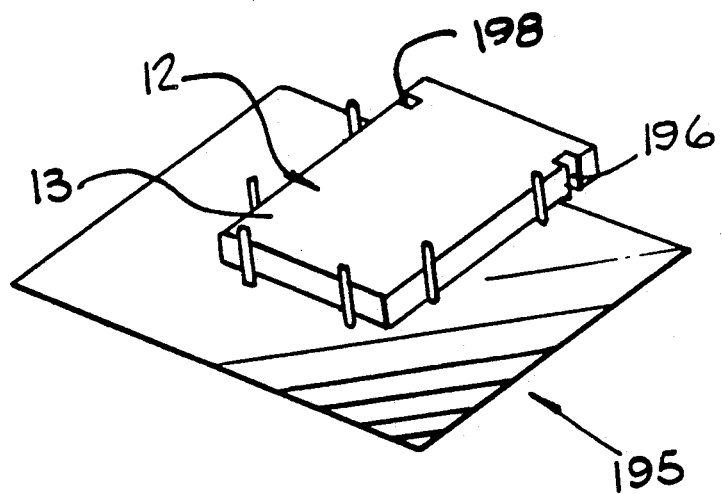
FIG. 1A is a schematic perspective view of an optical disk cartridge received in a storage device.

As illustrated in FIGS. 1, 6 and 7, the optical disk holding means 18 may comprise a generally transversely extending central body portion 190 and a pair of pivotally movable finger portions 192, 194 which are mounted at the terminal ends of the central body portion 190. The finger portions are adapted to be moved into and out of engagement with notch portions 196, 198 of optical disk cartridge 12. When the finger portions 192, 194 are engaged with notch portions 196, 198, the optical disk cartridge is held in fixed relationship with respect to the holding means 18 such that linear movement of the holding means 18 will be accompanied by a corresponding linear movement of the optical disk cartridge 12. When the finger portions 192, 194 are disengaged from notch portions 196, 198, the optical disk cartridge is released from the holding means. In operation, the holding means is adapted to move forwardly and rearwardly within the guide means cavity 178. The holding means may move to a forwardmost position, indicated by the position of member 222 shown in phantom in FIG. 1, whereat the finger portions 192, 194 thereof project outwardly from the forward opening of the cavity (not shown) to enable the holding means to engage the rear end portion of a cartridge which is positioned next adjacent to the guide means 16 forward end portion. The cartridge 12 which is to be engaged may be located in a storage device 195, such as shown schematically in FIG. 1A, which restrains forward and lateral displacement of the cartridge. After cartridge engagement, the holding means may move rearwardly in direction 42 to the position illustrated in FIG. 1 whereat the rear wall surface 198 of the holding means, FIG. 7, in one embodiment is positioned in abutting contact with the yoke member forward wall portion 138.

The holding means may comprise a detent engaging hole (not shown) on a lower surface portion thereof which is adapted to releasably engage guide means detent means 165 as further described below.

As illustrated in FIGS. 6 and 7, the optical disk holding means 18 has plunger means 76 mounted thereon comprising a first plunger member 210 which may be, e.g., 0.52 inches in length, and a second plunger member 212 of identical axial length. The plunger members 210, 212 are fixedly attached to the rear wall surface 198 of the optical disk holding means and are adapted to pass through rectangular bores 142, 144, respectively, in the guide means yoke member 120. As illustrated by FIG. 6, when the optical disk holding means 18 has moved as far rearwardly as the yoke member will allow, the plunger members 210, 212 project rearwardly from the rear surface of the yoke member. In one preferred embodiment, the plunger members 210, 212 project 0.19 inches rearwardly from the rear face surface of the yoke member which circumscribes an associated bore 142 or 144.

The plunger members each comprise an axial end surface 213, FIGS. 6 and 12, which is adapted to axially engage a portion of the latch means so as to trip the latch means to cause disengagement of the projection means as described in further detail hereinafter. Each plunger member 210, 212 also comprises an axially extending surface 216, FIGS. 12 and 13, which is adapted to engage an axially extending surface of the latch means to produce nontripping, yielding deflection of a portion of the latch means during a period of initial engagement of the latch means and the projection means as described in further detail below.

Drive Means And Force-Sensitive Control Means

Drive means 50 may comprise a conventional reversible polarity electrical motor 51 such as for example, that sold under the model designation Series 14,000 DC Servo Motor manufactured by Pittman Corporation of Harleysville, Pa., 19438-0003. The drive motor is preferably mounted on a non-movable support surface 216 as by bolts or other conventional attachment means. The drive means comprises a rotatable drive shaft 218 which provides the torque used to both flip and to linearly displace the optical disk cartridge 12 engaged by the holding means.

The displacement-sensitive control means 80 may comprise a conventional motor rotation sensing device, referred to in the art, such as that sold under the product designation HEDS-5500 Encoder which is manufactured by Hewlett-Packard Company having a business address of 3003 Scott Blvd., Santa Clara, Calif., 95054. The drive means 50 electrical motor produces a predetermined number of encoder pulses per revolution, e.g. 2000 pulses per revolution. The number of motor revolutions required to produce a predetermined amount of rotation displacement, e.g. 180° of displacement of the guide means are determined experimentally. The number of encoder pulses required to produce this predetermined amount of guide means rotation are thus calculated and used by control software in a microcomputer 219 to determine when the motor operation is to be terminated and reversed The number of motor rotations associated with a predetermined amount of linear displacement of the holding means is also determined experimentally. From this motor revolution value a corresponding encoder displacement value is calculated which is also used by the control software to terminate and reverse motor operation. Thus, after the counting of a predetermined number of encoder pulses associated with a particular operating phase of the apparatus, the control means 80 sends an appropriate control signal to a conventional motor switching assembly 81 which terminates operation of the motor and also reverses polarity of the motor such that when the motor is restarted, it will rotate in the direction opposite to that in which it was previously rotating. Another signal may be provided to switching assembly 81 to start operation of the motor in the new direction. Such a signal may be provided by a human operator or may be provided by an automatic control unit 219 which may comprise a microcomputer and which may be part of a large, integrated optical disk handling system.

Linear Displacement Means and Restraining Means

As illustrated by FIG. 1, the linear displacement means 54 for producing relative linear displacement between the guide means 16 and the holding means 18 may comprise a worm drive screw 220 having a rear end portion 221 rotatably mounted in mounting stud 146 and a forward end portion 223 rotatably mounted in support block 184. A screwingly driven member 222 is threadably mounted on the worm drive screw 220 and is relatively forwardly movable therealong through rotation of screw 220 in a first screw rotation direction 224 and is rearwardly movable therealong through rotation of the screw 220 in a second rotation direction 226. The screwingly driven member 222 is fixedly attached to an upper portion of the optical disk holding means 18. Thus, the optical disk holding means is linearly forwardly displaceable within the guide means through rotation of worm drive screw 220 in first screw direction 224 and is linearly rearwardly displaceable within the guide means through rotation of screw 220 in second screw direction 226.

The restraining means 78 which restrain the linear displacement of the holding means 18 may comprise the mounting stud 146 and the mounting block 184 which limits the linear displacement of the screwingly driven member 222 Alternately, the worm drive unit may be constructed and arranged such that the holding means comes into contact with the front wall surface 138 of the yoke member prior to contact of the driven member 222 with stud member 146 in which case surface 138 may act as a restraining means 78. Similarly, the construction and arrangement of a storage system such as 195 from which an optical disk cartridge 12 is to be retrieved, may be such that the holding means 16 will be retrained in its forward movement by engagement with the optical disk cartridge 12 before screwingly driven member 222 comes into contact with block 184 in which case the optical disk and its storage medium will act as a linear movement restraining means 78.

Transmission Means

Figure 14:
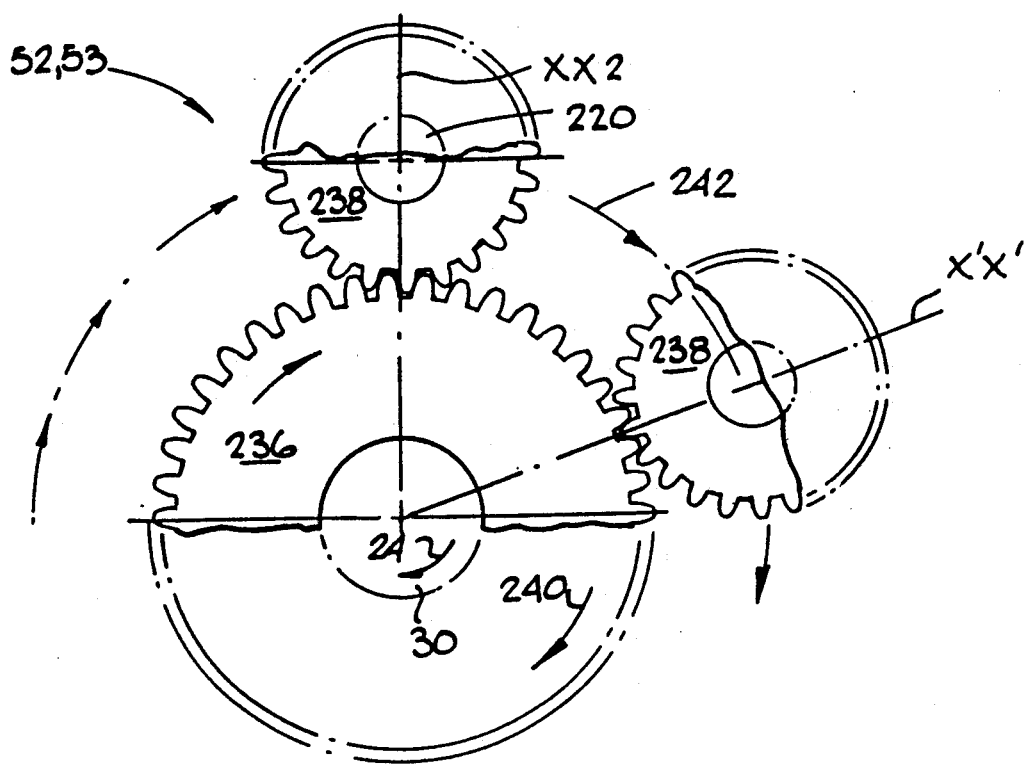
FIGS. 14-16 are schematic, rearwardly-facing elevation views of a transmission assembly showing various operating modes thereof.

As best illustrated in FIGS. 1 and 14–16, the transmission means 52 comprises a first shaft gear member 230 which is received on shaft 30 in coaxial relationship with axis AA thereof and which is freely rotatable with respect to shaft 30. The first shaft gear member 230 is drivingly linked as by drive belt 232 and motor gear 234 to the drive shaft 218 of the drive means. The transmission means includes a second shaft gear 236 which is freely rotatably received on shaft 30 in coaxial relationship therewith and which is connected to first shaft gear member 230 as by weldament, or other conventional attachment means, such that rotation of first shaft gear member 230 produces corresponding rotation of second shaft gear member 236. Second shaft gear member 236 may be a toothed gear member. The transmission means also includes a worm drive gear member 238 which is fixedly mounted on an end portion of worm drive screw 220 such that rotation of gear member 236 produces opposite rotation of gear member 238 and worm screw 220. Worm drive gear member 238 may also be a toothed gear member. The gear ratio between gears 236 and 238 may be 32 to 15. Second shaft gear member 236 and worm drive gear member 238 are constructed and arranged such that the two gear members are continuously engaged with one another. As illustrated in FIG. 14, in a first mode of operation in which torque from the drive means is provided in first torque direction 56 and in which the worm drive screw is prevented from rotating in direction 226, rotation of first shaft gear member 230 by the drive belt produces corresponding rotation of second shaft gear member 236 in rotation direction 240 which causes worm drive gear member 238 to be orbitally displaced about shaft axes AA, BB in orbital direction 242. The orbital motion of the worm drive gear member 238 causes corresponding rotation of the guide means 16 and shaft 30 about their central longitudinal axes AA, BB in direction 24.

Figure 15:
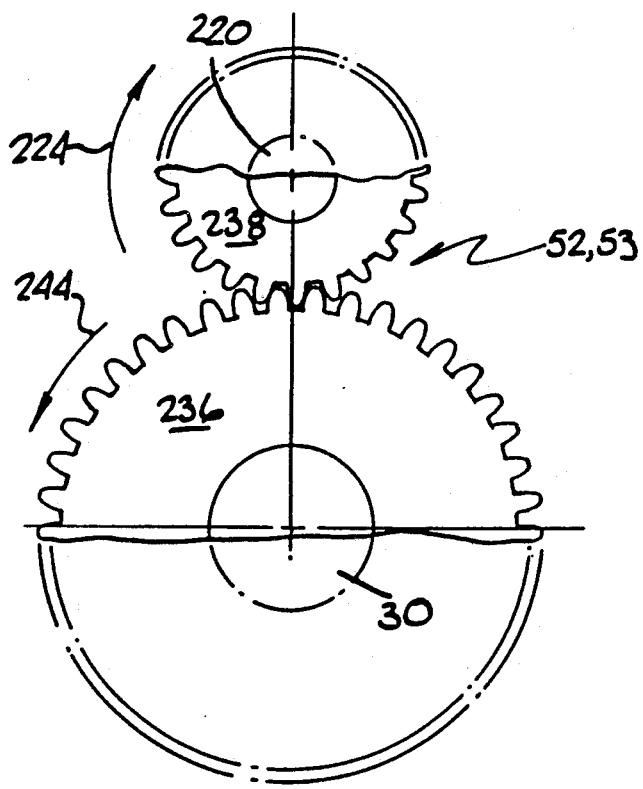

As illustrated in FIG. 15, when the worm drive screw 220 is free to rotate in direction 224 (with corresponding forward movement of the holding means) and when the guide means 16 is prevented from rotating about axis BB, then rotational movement of first shaft gear 230 produced by a torque in second torque direction 58 causes corresponding rotation of second shaft gear 236 in direction 244 which, in turn, causes worm drive gear member 238 to rotate in direction 224 about its central longitudinal axis GG with corresponding rotation of worm drive screw 220 and forward movement of holding means 18.

Figure 16:
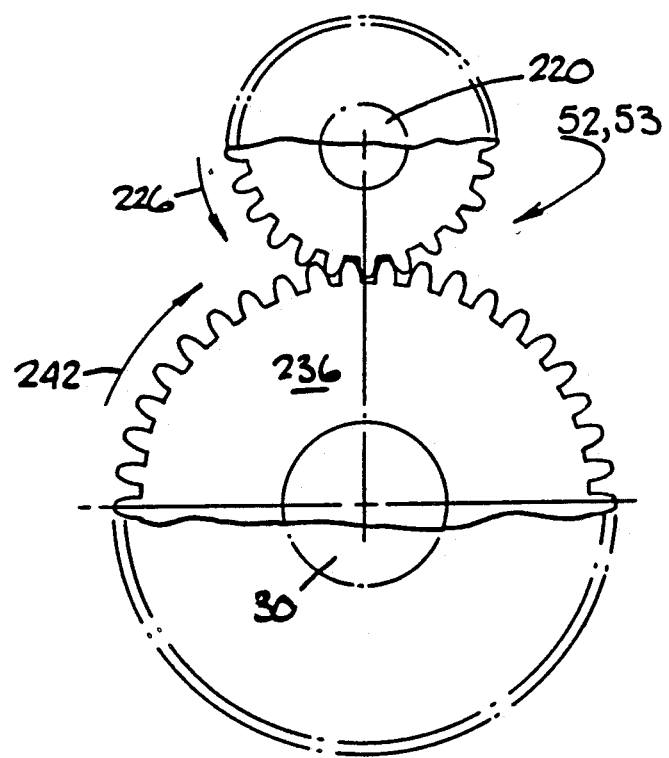

As illustrated in FIG. 16, when the worm drive screw 220 is freely rotatable in direction 226 and when the guide means is prevented from rotating in direction 24 and when a drive torque is applied in direction 56 to first shaft gear member 230, second shaft gear member 236 rotates in direction 242 causing worm drive gear member 238 to rotate about its central longitudinal axis in rotation direction 226 with corresponding rotation of worm drive screw 220 which causes the holding means to be moved rearwardly.

Latch Means

Figure 13:
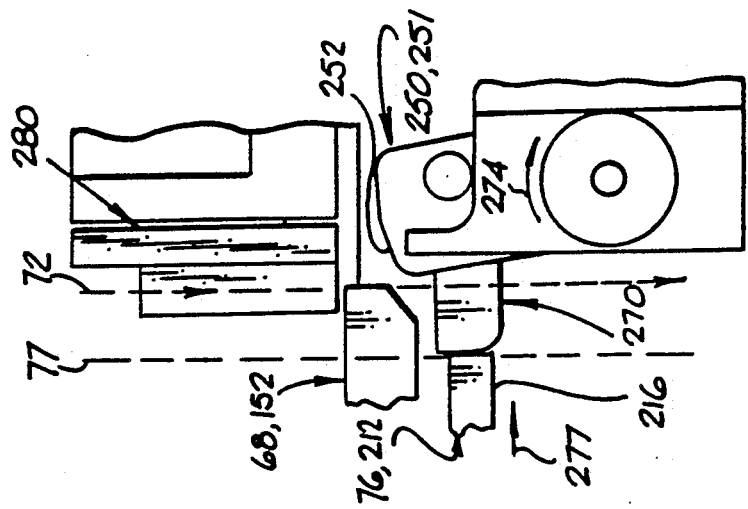
FIGS. 11-13 are side elevations views of a latch assembly showing various operating positions thereof.

As best illustrated by FIG. 2, latch means 70 comprise a first deflectable member means 250. Member means 250 is adapted for engaging the projection means 68 during rotation of the guide means 16 in a first direction 24 for terminating the rotation in the first direction 24 and for restraining further rotation of the guide means in the first rotation direction 24. The first deflectable member means 250 comprises a first surface portion 252 which is adapted to engage the projection means 68. The first deflectable member means has a first operating position as shown in FIGS. 2 and 8-12 wherein the first surface portion is positioned in intersecting relationship with the circular travel path 72 of the projection means 68. As illustrated in FIG. 13, the first deflectable member means has a second operating position wherein the first surface portion 252 is positioned in displaced relationship with the projection means circular travel path 72. The first deflectable member means is biased in the first operating position, FIG. 12, and is deflectable into the second operating position, FIG. 13, through application of axial force thereto by the plunger means 76. As illustrated by FIG. 2, the first deflectable member means 250 may comprise a pivotal member 251 having a laterally extending pivot axis MM. The pivotal member 251 may be biased in the first operating position illustrated in FIG. 2 by a conventional biasing spring 254, FIG. 8. The member may include a laterally projecting stud portion 256 which limits its forward displacement through engagement with bracket portion 258.

Figure 11:
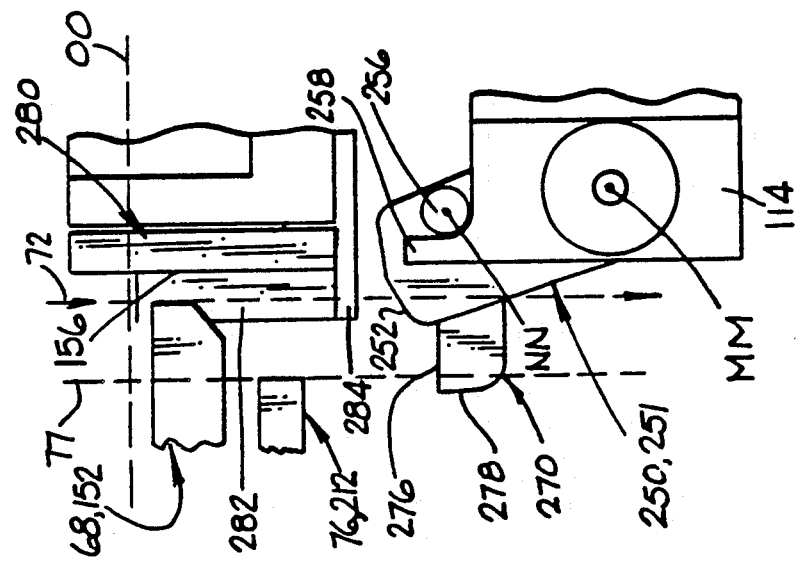

As best illustrated in FIG. 2, the latch means 70 comprises a force transmission member means 270, such as pivotal member 271, for transmitting force from the plunger means to the first deflectable member means 250 for moving the first deflectable member means from the first operating position thereof to the second operating position thereof. Force transmission member means 270 comprises a first end 272 attached to the first deflectable member means and a second end 274 having a first surface portion 276 adapted to engage the plunger means 76 during circular movement thereof and a second surface portion 278 adapted to engage the plunger means during axial movement thereof The force transmission member 270 has a first operating position with respect to the first deflectable member means 250 as best illustrated in FIGS. 2, 8, 11 and 13. The force transmission member means 270 is normally biased in this first operating position The force transmission member means 270 has a second operating position wherein it is relatively downwardly deflected with respect to the first operating position as illustrated in FIGS. 10 and 12. During rotation of the guide means, the plunger means 76 are always positioned in its rearwardmost location as illustrated in FIG. 6. In this position, the circular path 77 which the projection means travel during rotation of the guide means, intersects the first surface portion 276 of the force transmission member means 270 when the first deflectable member means 250 is in its normal biased position, and when the force transmission member means 270 is in its first operating position as illustrated in FIGS. 2 and 11. The plunger means thus engages the first surface portion 276 of the transmission member means 270 moving it from its first operating position shown in FIGS. 2 and 11 to its second operating position illustrated in FIGS. 10 and 12. Due to the fact that the projection means exerts little axial force against the force transmission member 270 during the above-described motion, the force transmission member exerts negligible axial force against the first deflectable member means 250 and thus, the first deflectable member means 250 remains in its normal biased position as illustrated in FIG. 12. Relative forward motion of the plunger means from the position illustrated in FIG. 12 causes removal of the downward force applied to the force transmission member means thereby enabling the force transmission member means to return to its first operating position illustrated in phantom in FIG. 12. During this forward movement of the plunger means, the projection means remains in engaged relationship with the first deflectable member means 250. The force transmission member means 270, after its return to its first operating position, has the second surface portion 278 thereof, positioned in aligned relationship with the plunger means such that when the plunger means again moves rearwardly 277, as shown in FIG. 13, it engages the second surface 278 and urges the force transmission member means 270 rearwardly with corresponding rearward deflection 279 of the first deflectable member means 250.

The force transmission member means may be pivotally attached to the first deflectable member means 250 about a pivot axis NN extending transversely of the plunger means.

The latch means 70 comprises a second deflectable member means 280 for engaging the projection means 68 during engagement of the projection means by the first deflectable member means 250 for restraining rotation of the guide means 16 in the second rotation direction 26. The second deflectable member means 280 has a first surface portion 282, FIG. 2, which is adapted to yieldingly engage the projection means 68 first surface 156 prior to engagement of the projection means with the first deflectable member means 250. The second deflectable member means has a second surface portion 284 which is adapted to nonyieldingly engage the projection means 68 second surface 158 during engagement of the projection means with the first deflectable member means 250. The second deflectable member means has a first operating position wherein the first surface portion 282 and the second surface portion 284 are both intersected by the circular travel path 72 of the projection means 68 as illustrated in FIG. 8. The second deflectable member means has a second operating position, FIG. 9, wherein the first surface portion 282 and the second surface portion 284 are displaced from the circular travel path of the projection means enabling it to pass. The second deflectable member has a third operating position, Fig. 10, intermediate the first operating position and the second operating position, wherein the second surface portion 284 is positioned in engaged relationship with the projection means and wherein the projection means is positioned in engaged relationship with the first deflectable member means 250. The second deflectable member means 280 is biased in the first operating position and is deflectable from the first operating position to the second operating position, as indicated at 290, through force applied to the first surface portion by the projection means 68. The second deflectable member means 280 is biasingly returnable, as indicated at 292, from the second operating position, FIG. 9, to the third operating position, FIG. 10, during the period of engagement between the projection means 68 and the first deflectable member means 250 and is biasingly returnable from the third operating position, FIG. 10, to the first operating position, FIG. 8, subsequent to the disengagement of the projection means 68 from the first deflectable member means 250. The second deflectable member means second surface portion 284 may comprise a radially tapering surface which is adapted to progressively, wedgingly engage the projection means during movement of the second deflectable member means from the second operating position thereof to the third operating position thereof. This progressive wedging engagement of the projection means by the radially tapering second surface portion 284 of the second deflectable member means 280 causes the projection means to be locked in a zero tolerance relationship between the first deflectable member means and the second deflectable member means when the second deflectable member means is in the third operating position. The second deflectable member means may comprise a pivotal member 281 having a pivot axis OO extending parallel to the central axis of rotation AA of the guide means 16. The second deflectable member means may be biased in direction 292 as by a conventional torsion spring (not shown) and may be restrained from movement in its biased direction beyond its biased position as by a projection 286 of the pivot member which engages a projecting portion 288 of bracket 114, FIG. 2. In one preferred embodiment, surface 284 is positioned at a radial distance from axis OO of 0.55 inches at point 285, and 0.59 inches at point 287, tapering uniformly therebetween, FIG. 8.

Operation

Figure 4:
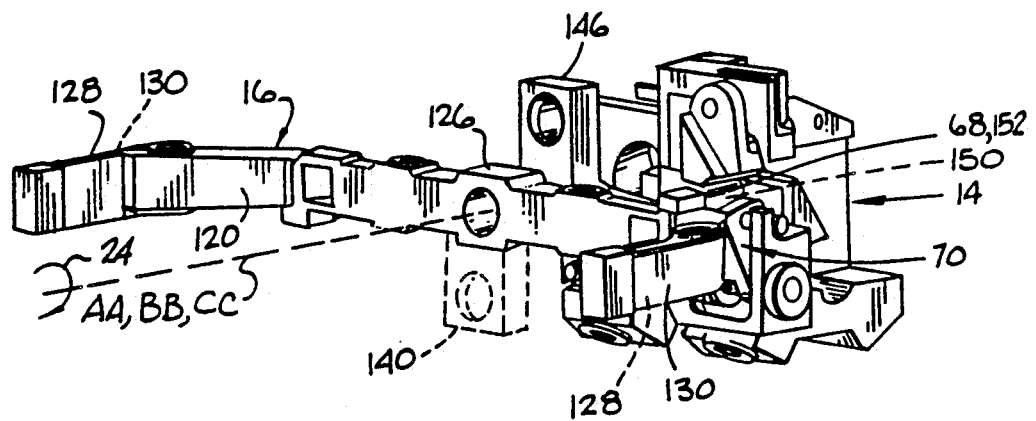

The basic sequence of operation of the optical disc handling apparatus 10 is illustrated in FIGS. 3-5. Certain structural features of the apparatus have been removed to more clearly illustrate the operation of the apparatus. Thus, with respect to the guide means 16, only the yoke member 120 is shown.

FIG. 3 illustrates a position occupied by the guide means 16 during rotation thereof in direction 24 between the position occupied in FIG. 4, phantom position, and the position occupied in FIG. 4. Although the holding means 18 is eliminated from this drawing in order to show certain structural details of the yoke member, it will be understood that the holding means is located in its rearwardmost relationship with the guide means, i.e., the position illustrated in FIG. 6, when the guide means 16 is in the relatively rotated position illustrated in FIG. 3. Next, as illustrated in FIG. 4, the guide means 16 is moved into a latched, non-rotating position through engagement of the second projection member 152 with the latch means 70. The sequence of events by which the projection member 152 becomes lockingly engaged with the latch means will be described in further detail below. Next, as illustrated in FIG. 7, the holding means is linearly displaced forwardly, i.e., in direction 40, with respect to the guide means. Movement in direction 40 may continue until the holding means encounters a resistance, e.g., the resistance between worm drive linear displaceable member 222 and block 184, FIG. 1-phantom, or the engagement of the optical disc with a storage unit forward housing portion (not shown). Next, the optical disc holding means 18 moves rearwardly, direction 42, with respect to the guide means until it reaches its rearmost location relative thereto as illustrated in FIG. 6. During the final portion of this forward movement of the holding means with respect to the guide means, the second plunger member 212 actuates the latch means 70 to release the second projection member 152 therefrom. At the same time, or approximately the same time that the second plunger member 212 causes disengagement of the projection member from the latch means, the holding means 18 reaches its farthest rearward location with respect to the guide means. Next, as illustrated in FIG. 5, the guide means 16, in response to the release of projection member 152 from the latch means, begins to again rotate in direction 24. Next, as illustrated in FIG. 4-phantom, the rotation of the guide means 16 is terminated when the first projection member 150 is engaged by the latch means 70. Next, the holding means is again moved linearly forwardly relative to the guide means and stops movement. The holding means then again moves linearly rearwardly with respect to the guide means until reaching its rearwardmost location. At the same time, or approximately the same time that the holding means reaches its rearwardmost location, the first plunger member 210 actuates the latch means 70 to disengage the first projection member 150 therefrom. The disengagement of member 150 enables the guide means to again rotate from the position illustrated in FIG. 4-phantom, through the position illustrated in FIG. 3 to the position illustrated in FIG. 4. This completes the general description of one operating cycle of the invention and it will be understood that this cyclical sequence of events continually repeats during operation of the apparatus. Having thus described the general operation of the apparatus, certain specifics of operation will now be described in further detail.

Operation of the Latch Means

As described above, in the illustrated embodiment of the invention the projection means 68 comprise two diametrically opposed projection members 150, 152 which each travel in the same circular travel path 72 and which each project rearwardly from the guide means 16 the same axial distance. As illustrated in FIG. 8, the path 72 which each of the projection members 150, 152 travels during rotation of the guide means 16 intersects the top surface portion 252 of the first deflectable member means 250 when the first deflectable member means 250 is in its normally biased position, i.e., the position illustrated in FIGS. 2, 8 and 11, in which the top portion thereof projects forwardly from the mounting bracket 114. Thus, as guide means 16 rotates in direction 24, one of the projection members, e.g., 152, is moved into engagement with surface 252. This engagement terminates further movement of the projection member in direction 72 and thus terminates rotation of the guide means 16 in direction 24. Prior to the time that member 152 makes contact with second deflectable member 250, it makes initial contact at a lower surface portion 156 thereof with second deflectable member first surface 282, FIG. 8. The force applied against surface 282 by projection member 152 causes the second deflectable member means 280 to pivot in direction 290 about its pivot axis 00 until member 152 is moved out of engagement with surface 282 as illustrated in FIG. 9. Next, as illustrated in FIG. 10, the engagement of projection member 152 with surface 252 of first deflectable member means 250 prevents further movement of member 152 along path 72, and the return pivotal movement 292 of second deflectable member means 280 from the position shown in FIG. 9 toward its original biased position illustrated in FIG. 8 causes the tapered second surface 284 thereof to make engaging contact with the upper surface 158 of member 152 as shown in FIG. 10. Due to the direction of bias of member 280 and the progressive taper of surface 284, the surface 284 urges member 150 against surface 252 as member 280 biasingly rotates in direction 292. Thus, member 152 is locked in zero tolerance relationship between surface 284 of the second deflectable member means and surface 252 of the first deflectable member means. Guide means 16 is thus prevented from rotating either in its original direction of rotation 24 or in reverse direction 26 due to this zero tolerance locking engagement of member 152 between surfaces 282 and 252.

The plunger means 76, i.e. plunger members 210 and 212, always occupy a rearwardlymost projected position, e.g., the position illustrated in FIG. 6, during the rotation of guide means 16.

During the period of guide means 16 rotational motion associated with the movement of projection member 152 from the position of initial contact with the latch means illustrated in FIG. 8 to the position of locked engagement therewith illustrated in FIG. 10, the second plunger member 212 travels along a concentric path 77 which is positioned slightly radially inwardly, e.g., 0.2 inches inwardly, of path 72 which is travelled by the projection member 152. The plunger means rotation path 77, as illustrated at FIGS. 8 and 11, intersects the top surface 276 of force-transmission member means 270. As described above, force-transmission member means 270 is deflectable from its normal biased position, illustrated in FIGS. 8 and 11, to a downwardly deflected position with respect to the first deflectable member means 252 as illustrated in FIGS. 10 and 12. Thus, the movement of projection member 152 along path 72 from the position illustrated in FIG. 8 to the position illustrated in FIG. 10, is accompanied by the movement of plunger member 212 along path 77. FIG. 11 is a side elevation view showing the relationship of the projection member 152 and the plunger member 212 at the positions thereof illustrated in FIG. 8, just prior to contact with the latch means. FIGS. 10 and 12 show the deflection of the force-transmission member means 76 produced by downward pressure from the plunger member 212 after the initial engagement between the projection member 152 and first deflectable member means 250. It will be appreciated that this downward deflectable movement of the force-transmission member means 270 from the position illustrated in FIG. 11 to the position illustrated in FIG. 12 does not produce any corresponding pivotal movement of first deflectable member 250 and thus, the engaged projection member 152 remains in locked engagement between surfaces of the first and second deflectable member means.

Figure 12:
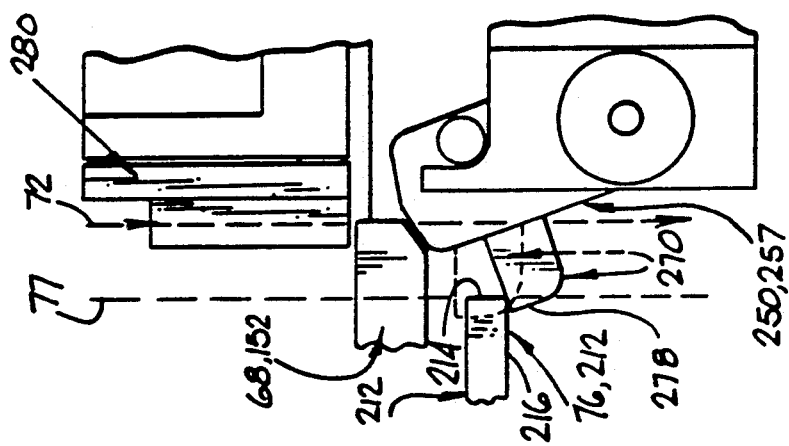

Subsequent to the engagement of the projection member 152 by deflectable member means 250 and 280 which is illustrated in FIGS. 10 and 12, the associated plunger member 212 is moved axially forwardly, e.g., FIG. 7, causing it to be removed from engagement with the force-transmission member means 270 and thereby allowing force-transmission member means 270 to return to its normal biased position illustrated in FIG. 11. During subsequent rearward movement of the associated plunger member 212, the axial end surface 214 thereof is positioned in axial alignment with the axial end surface 278 of the force-transmission member means 270. The rearward movement of plunger member 212 thus causes engagement between surfaces 214 and 278. The force-transmission member means 270 is constructed and arranged such that the axial force transmitted to surface 278 by the plunger member is normal to pivot axis NN and thus does not cause relative deflection of the force-transmission member means 270 relative to the first deflectable member means 250, but rather causes the axial force to be transmitted directly to the second deflectable member means. This force causes the second deflectable member means to be moved rearwardly from the position illustrated in FIG. 11 to the position illustrated in FIG. 13. As may be seen from FIG. 13, the rearward movement of the second deflectable member means 250 causes surface 252 thereof to be moved axially rearwardly and out of path 72 of projection member 152. This release of projection member 152 enables rotation of the guide means in rotation direction 24 with the accompanying movement of projection member 152 along path 72.

Operation of Transmission Means

As previously explained, the construction and arrangement of the transmission means 52 is such that torque from the drive means 50 may be provided either to produce rotation of the guide means 16 as illustrated in FIG. 14 or to produce rotation of the worm drive screw 220 in direction 224, FIG. 15, to cause forward movement of the holding means 18 within the guide means 20 or to produce rotation of the worm drive screw 220 in direction 226 to cause rearward movement of the optical disc holding means 18 within the guide means 16. The physical events which determine the mode of operation of the transmission means are the engagement and disengagement of the projection means 16 with the latch means 70 and the engagement of the optical disc holding means 18 with a restraining means 78. Each time the control means 80 senses a motor rotational displacement associated with either the engagement of the projection means with the latch means or the encountering of a restraining means by the linearly moving holding means 18, drive motor operation is terminated and the direction of operation is reversed such that when the motor is re-started, it will transmit torque in the opposite direction. In one preferred embodiment of the invention, the motor is re-started by a signal provided to switching unit 81 through a computer control unit 219. In another embodiment the motor is restarted by a human operator.

Detailed Operating Cycle

The combined operation of the various handling apparatus components during an operating cycle will now be described. The rotation of the guide means 16 in direction 24 shown in FIG. 3 occurs when the optical disc holding means 18 is positioned in its rearwardmost location, FIGS. 1 and 6, and with the drive means 50 providing torque in direction 56, FIG. 1. The abutting engagement of the holding means 18 with the forward wall 138 of the yoke member prevents the worm drive 220 and thus, worm drive gear 238, from being rotated in direction 226. Thus, the torque transmitted to gear 238 by gear 236 in response to drive motor torque 56 causes gear 238 to be moved orbitally with gear 236. As illustrated in FIG. 14, this orbital movement of gear 236 in direction 242 produces rotation of the guide means 16 which is physically connected to gear 236 by the worm drive mounting assembly The guide means 16 rotates in direction 24 until the projection member 152 engages the latch means 70 and is locked into immobile relationship therewith, FIGS. 4, 10 and 12. At the time that projection member 152 is initially engaged by the latch means member 251, the motor rotational displacement associated with this engagement is sensed by the control means 80 which terminates operation of drive motor 50 and reverses the direction of drive motor 50.

Next, drive motor 50 is restarted and transmits torque in direction 58, FIG. 1. Due to the fact that the second projection member 152 is locked in engagement with the latch means 70, rotation of the guide means 16 is prevented. Drive torque from gear 236 thus causes rotation of gear 238 about its central longitudinal axis GG in direction 224, as illustrated in FIG. 15, causing the holding means 18 to move forwardly, direction 40, with respect to the guide means 16 as illustrated in FIG. 7. In the absence of an overriding command signal, this motion of optical disc holding means 18 in direction 40 continues until the optical disc holding means encounters a restraining means which prevents further motion, such as, for example, the engagement of the driven member 222 with forward worm drive support block 184 or the engagement of an optical disc 12 with a storage unit abutment surface 197, FIG. 1A. When the drive motor has been rotatably displaced by a predetermined amount associated with the engagement of the holding means, etc., with the forward restraining means 78, the control means 80 terminates operation thereof and reverses the motor direction of rotation.

Next, when the motor is re-started, it applies torque in direction 56, FIG. 1, causing worm drive gear 238 to be rotated in direction 226, FIG. 16, causing the holding means 18 to be moved rearwardly, in direction 42, relative the guide means 16. It will be appreciated that no rotation of the guide means 16 occurs because the second projection member 152 remains locked in engagement with the latch means during this period of operation. As the holding means 18 completes its rearward displacement to the position illustrated in FIG. 6, plunger member 212 axially engages the latch means force-transmission member means 270 causing displacement of member 270 and associated second deflectable member means 280, FIG. 13. The rearward movement of member 280 thus releases projection member 152 from engagement with the latch means enabling guide means 16 to again rotate in direction 24. The holding means 18 moves into engagement with the rearward restraining means 78 simultaneously, or just after, the release of the projection means from the latch means. This engagement of the holding means 18 with the rearward restraint means 78 prevents further rotation of worm drive gear 238 in direction 226.

Thus, after the holding means reaches its rearwardmost position, the torque applied by gear 236 again, FIG. 14, causes orbital movement of gear 238 therewith causing corresponding rotation of the guide means 16. The guide means thus rotates, as illustrated in FIG. 5, until the first projection member 150 is engaged by the latch means 70 as illustrated in FIG. 4-phantom. Thereafter, the sequence of events described immediately above is repeated, except that projection member 150 is substituted for projection member 152 and plunger member 210 is substituted for plunger member 212. Thus, the holding means is moved forwardly in direction 40. Next, it is moved rearwardly in direction 42, causing plunger member 210 to trip the latch means and disengage projection 150 and enabling rotation of the guide means in direction 24. The guide means rotates through the position illustrated in FIG. 3 to the position illustrated in FIG. 4. Thus, a full operating cycle of the apparatus 10 is completed.

In the above described operating cycle, as an alternative to moving the holding means 18 in direction 40 until a stop surface is encountered, it is also possible to simply terminate the movement in direction 40 at some selected position, e.g., the position illustrated in FIG. 7, through an overriding control signal provided either by a human operator or a computer-based control system 219. Thereafter, the direction of rotation of motor 50 is reversed and the return motion of optical disc holding means 18 in direction 42 may be initiated to enable the plunger means to trippingly disengage the latch means from the projection means with the resulting flipping rotation of the guide means in direction 24.

In a relatively low friction system, a problem may be encountered with respect to the orbital motion of gear 238 as described with reference to FIG. 14. When a drive motor encounters a resistance, such as that produced by the transition from rearward holding means movement to rotating guide means movement, it tends to pulse, i.e. it accelerates rapidly and then decelerates somewhat before reaching its normal operating speed. As a result of such a motor pulse during operation in the mode illustrated in FIG. 14, gear 238 may be accelerated to an orbital velocity which is slightly greater than the rotational velocity of gear 236. As a result of this velocity difference, gear 238, if otherwise unrestrained, will rotate slowly about its axis GG in direction 224 as it moves orbitally along path 242. This slight rotation in direction 224 will result in forward movement of the holding means. If the amount of gear 236 rotation in direction 224 is great enough, it will cause forward displacement of the plunger means sufficient to disengage it from member 270 allowing member 270 to move from the position of FIG. 12 to the position of FIG. 12-phantom. After the guide means is stopped from rotating by the latch means, the gear 236 will continue to rotate in direction 240 causing gear 238 to rotate in direction 226 until the holding means is returned to its forwardmost position. If the initial forward movement of the holding means was sufficient to allow member 270 to return to the position of FIG. 11, then the subsequent rearward motion of the holding means will cause a premature release of the latch means, FIG. 13. In order to prevent such an occurrence, a detent means 165 as shown in FIG. 7 may be provided which produces a detent engagement between the holding means and guide means when the holding means is in its rearwardmost position. This detent engagement produces a detent force which resists forward displacement of the holding means which is sufficiently great to maintain the holding means in its forwardmost position during the transition from holding means linear movement to guide means rotational movement. This detent force is sufficiently small, however, such that it may be overcome by the torque provided by the drive motor during the period when the projection means is engaged by the latch means. Thus, the detent means prevents premature tripping of the latch means but does not otherwise effect the operation of the apparatus.

The present invention has been described in the environment of an optical disc handling system wherein the optical disc handling apparatus 10 is used to linearly displace an optical disc and is also used to flip an optical disc such that first, the top surface 13 and then the bottom surface 15 thereof, is positioned upwardly. It will be appreciated by those having skill in the art, after reading this disclosure, that a similar apparatus may be provided for handling objects other than optical discs and that such an apparatus may be constructed with any desired number of projection means for the purpose of sequentially placing a series of different surfaces of an object in a predetermined registration position. For example, a handling system for a cube-shaped object which is adapted to sequentially place each of four lateral side surfaces thereof in an upwardly facing orientation may be provided through the use of four equally circumferentially spaced projection members on a guide means with four corresponding plunger members being provided on a holding means. The construction of the latch means and transmission means in such a system may be identical to that disclosed with respect to the illustrated embodiment. The operation of such an apparatus would be identical to the operation of the illustrated embodiment except that the sequential engagement of four projection members rather than two projection members would be required to complete an operating cycle.

Thus, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A displacement apparatus for producing controlled linear and rotational displacement of an object received therein comprising:
   a) base means for supporting various components of said displacement apparatus thereon;
   b) guide means for guiding the movement of an object holding means, said guide means comprising a forward end, a rear end, and a central longitudinal axis extending between said forward end and said rear end, and being rotatable in a first direction and a second direction about said central longitudinal axis;
   c) shaft means for rotatably mounting said guide means on said base means, said shaft means comprising a first end fixedly attached to said rear end of said guide means, a second end rotatably received in said base means, and a central longitudinal axis extending in coaxial relationship with said central longitudinal axis of said guide means whereby said guide means is rotatable about said central longitudinal axis thereof through rotation of said shaft means;
   d) object holding means for engaging a object and holding said object in relatively stationary relationship therewith; said object holding means being received by said guide means in linearly displaceable, rotationally nondisplaceable relationship therewith, said object holding means being forwardly and rearwardly displaceable relative said guide means;
   e) drive means for providing reversible driving torque to a transmission means;
   f) linear displacement means for producing relative linear displacement between said guide means and said holding means in response to torque applied thereto;
   g) transmission means for transmitting torque from said drive means for producing rotational displacement of said guide means and linear displacement of said holding means;
      said transmission means having a first operating mode wherein torque applied thereto by said drive means in a first direction is transmitted to said guide means for rotating said guide means and said holding means in said first direction of rotation about said central longitudinal axis of said guide means;
      said transmission means having a second operating mode wherein torque applied thereto by said drive means in a second direction is transmitted to said linear displacement means for producing forward linear displacement of said holding means relative said guide means; and
      said transmission means having a third operating mode wherein torque applied thereto by said drive means in said first direction is transmitted to said linear displacement means for producing rearward linear displacement of said holding means relative said guide means;
   h) projection means projecting rearwardly from said guide means rear end for coacting with a latch means, said projection means being moved in a circular travel path by rotation of said guide means;
   i) plunger means operatively associated with said object holding means and projectable relative said rear end of said guide means for coacting with said latch means, said plunger means having a rearwardly extended position and a forwardly retracted position;
   j) latch means mounted on said base means for engaging said projection means during rotation of said guide means in said first direction of rotation for terminating rotation of said guide means and for restraining said guide means from further rotation in said first direction and said second direction and for coacting with said plunger means for disengaging said projection means from said latch means for enabling rotation of said guide means in said first direction of rotation; and
   k) restraining means operatively associated with said holding means for restraining linear displacement thereof.

2. The invention of claim 1 further comprising:
drive means displacement sensing control means for terminating the driving torque and for reversing the direction of the driving torque provided by said drive means in response to said drive means being angularly displaced by a predetermined amount from an immediately previous stopped position.

3. The invention of claim 1, said latch means comprising:
a first deflectable member means for engaging said projection means during rotation of said guide means in said first direction for terminating said rotation in said first direction and for restraining further rotation in said first rotation direction.

4. The invention of claim 3, said first deflectable member means comprising a first surface portion adapted to engage said projection means and having:
a first operating position wherein said first surface portion thereof is positioned in intersecting relationship with said projection means circular travel path;
a second operating position wherein said first surface portion thereof is positioned in displaced relationship with said projection means circular travel path; and
said first deflectable member means being biased in said first operating position and being deflectable into said second operating position through application of force thereto by said plunger means.

5. The invention of claim 4 wherein said first deflectable member means comprises a first pivotable member having a first pivot axis.

6. The invention of claim 5 wherein said first pivot axis extends transversely of said central longitudinal axis of said guide means.

7. The invention of claim 6 wherein said first engagement surface of said first deflectable member means is positioned relatively forwardly in said first operating position thereof and is positioned relatively rearwardly in said second operating position thereof.

8. The invention of claim 4 wherein said latch means comprises a force transmission member means for transmitting force from said plunger means to said first deflectable member means for moving said first deflectable member means from said first operating position thereof to said second operating position thereof.

9. The invention of claim 8 wherein said force transmission member means comprises a first end attached to said first deflectable member means and a second end having a first surface portion adapted to engage said plunger means during circular movement thereof and a second surface portion adapted to engage said plunger means during axial movement thereof.

10. The invention of claim 9 wherein said force transmission member means comprises first operating position relative said first deflectable member means and a second operating position relative said first deflectable member means;

said force transmission member means being adapted to transmit axial force from said plunger means to said first deflectable member means when said force transmission member means is in said first operating position.

11. The invention of claim 10 wherein said force transmission member means is biased in said first operating position and is deflectable from said first position to said second position through application of generally radially directed force to said first surface portion thereof by said plunger means through rotation of said guide means in said first direction of rotation.

12. The invention of claim 11 wherein said force transmission member means is pivotally attached to said first deflectable member means about a transmission member pivot axis.

13. The invention of claim 12 wherein said force transmission member pivot axis extends transversely of said plunger means.

14. The invention of claim 3 wherein said latch means comprises a second deflectable member means for engaging said projection means during engagement of said projection means by said first deflectable member means for restraining rotation of said guide means in said second rotation direction.

15. The invention of claim 14 wherein said second deflectable member means comprises:

a first surface portion adapted to yieldingly engage said projection means prior to engagement of said projection means with said first deflectable member means; and a second surface portion adapted to nonyieldingly engage said projection means during engagement of said projection means with said first deflectable member means.

16. The invention of claim 15 wherein said second deflectable member means comprises:

a first operating position wherein said first surface portion and said second surface portion thereof intersect said circular travel path of said projection means;

a second operating position wherein said first surface portion and said second surface portion thereof are displaced from said circular travel path of said projection means;

a third operating position intermediate said first operating position and said second operating position wherein said second surface portion is positioned in engaged relationship with said projection means and said projection means is position in engaged relationship with said first deflectable member means;

said second deflectable member means being biased in said first operating position and being deflectable from said first operating position to said second operating position through force applied to said first surface portion of said second deflectable member means by said projection means; and said second deflectable member means being biasingly returnable from said second operating position to said third operating position during the engagement of said projection means and said first deflectable member means and being biasingly returnable from said third operating position to said first operating position subsequent to the disengagement of said projection means from said first deflectable member means.

17. The invention of claim 16 wherein said second deflectable member means second surface portion comprises a tapering surface adapted to progressively wedgingly engage said projection means during movement of said second deflectable member means from said second operating position to said third operating position whereby said projection means is held in locked, zero-tolerance relationship between said first deflectable member means and said second deflectable member means when said second deflectable member means is in said third operating position.

18. The invention of claim 17 wherein said second deflectable member means comprises a pivotal member.

19. The invention of claim 18 wherein said second deflectable member comprises a pivot axis extending parallel to said central axis of rotation of said guide means.

20. A rotatable member and latching assembly comprising:

a) a rotatable member having a forward end, a rear end, and a longitudinally extending central axis of rotation and being rotatable in a first direction and a second direction about said axis of rotation;

b) fixed projection means projecting rearwardly from said rotatable member and positioned in radially displaced relationship from said central axis of rotation for coacting with a latch means, said projection means being displaceable in a circular travel path through rotation of said rotatable member;

c) axially extendable and retractable plunger means positioned radially proximate said projection means and having a rearwardly extended position and a forwardly retracted position relative said rear end of said rotatable member for coacting with said latch means; and d) latch means positioned rearwardly of said rotatable member at a fixed radial and circumferential position relative said rotatable member central axis of rotation for engaging said projection means during rotation of said rotatable member in said first rotation direction and for terminating said rotation in said first direction and for restraining rotation of said rotatable member in said first direction and said second direction during engagement with said projection means; and for coacting with said plunger means subsequent to engagement with said projection means for releasing said projection means from engagement with said latch means for permitting rotation of said rotatable member in said first direction while preventing rotation thereof in said second direction.

21. The invention of claim 20, said latch means comprising:
a first deflectable member means for engaging said projection means during rotation of said rotatable member in said first direction for terminating said rotation in said first direction and for restraining further rotation in said first rotation direction.

22. The invention of claim 21, said first deflectable member means comprising:
a first surface portion adapted to engage said projection means and having a first operating position wherein said first surface portion thereof is positioned in intersecting relationship with said projection means circular travel path;
a second operating position wherein said first surface portion thereof is positioned in displaced relationship with said projection means circular travel path; and
said first deflectable member means being biased in said first operating position and being deflectable into said second operating position through application of force thereto by said plunger means.

23. The invention of claim 22 wherein said first deflectable member means comprises a first pivotable member having a first pivot axis.

24. The invention of claim 23 wherein said first pivot axis extends transversely of said central longitudinal axis of said guide means.

25. The invention of claim 24 wherein said first engagement surface of said first deflectable member means is positioned relatively forwardly in said first operating position thereof and is positioned relatively rearwardly in said second operating position thereof.

26. The invention of claim 21 wherein said latch means comprises a force transmission member means for transmitting force from said plunger means to said first deflectable member means for moving said first deflectable member means from said first operating position thereof to said second operating position thereof.

27. The invention of claim 26 wherein said force transmission member means comprises a first end attached to said first deflectable member means and a second end having a first surface portion adapted to engage said projection means during circular movement thereof and a second surface portion adapted to engage said plunger means during axial movement thereof.

28. The invention of claim 27 wherein said force transmission member means comprises a first operating position relative said first deflectable member means and a second operating position relative said first deflectable member means;
said force transmission member means being adapted to transmit axial force from said plunger means to said first deflectable member means when said force transmission member means is in said first operating position.

29. The invention of claim 28 wherein said force transmission member means is biased in said first operating position and is deflectable from said first position to said second position through application of generally radially directed force to said first surface portion thereof by said plunger means through rotation of said rotatable member in said first direction of rotation.

30. The invention of claim 29 wherein said force transmission member means is pivotally attached to said first deflectable member means about a transmission member pivot axis.

31. The invention of claim 30 wherein said force transmission member pivot axis extends transversely of said plunger means.

32. The invention of claim 21 wherein said latch means comprises a second deflectable member means for engaging said projection means during engagement of said projection means by said first deflectable member means for restraining rotation of said rotatable member in said second rotation direction.

33. The invention of claim 32 wherein said second deflectable member means comprises:
a first surface portion adapted to yieldingly engage said projection means prior to engagement of said projection means with said first deflectable member means; and
a second surface portion adapted to nonyieldingly engage said projection means during engagement of said projection means with said first deflectable member means.

34. The invention of claim 33 wherein said second deflectable member means comprises:
a first operating position wherein said first surface portion and said second surface portion thereof intersect said circular travel path of said projection means;
a second operating position wherein said first surface portion and said second surface portion thereof are displaced from said circular travel path of said projection means;
a third operating position intermediate said first operating position and said second operating position wherein said second surface portion is positioned in engaged relationship with said projection means and said projection means is position in engaged relationship with said first deflectable member means;
said second deflectable member means being biased in said first operating position and being deflectable from said first operating position to said second operating position through force applied to said first surface portion of said second deflectable member means by said projection means; and
said second deflectable member means being biasingly returnable from said second operating position to said third operating position during the engagement of said projection means and said first deflectable member means and being biasingly returnable from said third operating position to said first operating position subsequent to the disengagement of said projection means from said first deflectable member means.

35. The invention of claim 34 wherein said second deflectable member means second surface portion comprises a tapering surface adapted to progressively wedgingly engage said projection means during movement of said second deflectable member means from said second operating position to said third operating position whereby said projection means is held in locked, zero-tolerance relationship between said first deflectable member means and said second deflectable member means when said second deflectable member means is in said third operating position.

36. The invention of claim 35 wherein said second deflectable member means comprises a pivotal member.

37. The invention of claim 36 wherein said second deflectable member comprises a pivot axis extending parallel to said central axis of rotation of said guide means.

38. An optical disk handling apparatus for producing controlled linear and rotational displacement of an optical disk received therein comprising:
   a) base means for supporting various components of said apparatus thereon;
   b) guide means for guiding the movement of an optical disk holding means, said guide means comprising a forward end, a rear end, and a central longitudinal axis extending between said forward end and said rear end, and being rotatable in a first direction and a second direction about said central longitudinal axis;
   c) shaft means for rotatably mounting said guide means on said base means, said shaft means comprising a first end fixedly attached to said rear end of said guide means, a second end rotatably received in said base means, and a central longitudinal axis extending in coaxial relationship with said central longitudinal axis of said guide means whereby said guide means is rotatable about said central longitudinal axis thereof through rotation of said shaft means;
   d) optical disk holding means for engaging an optical disk and holding said optical disk in relatively stationary relationship therewith; said optical disk holding means being received by said guide means in linearly displaceable, rotationally nondisplaceable relationship therewith, said optical disk holding means being forwardly and rearwardly displaceable relative said guide means;
   e) drive means for providing reversible driving torque to a transmission means;
   f) linear displacement means for producing relative linear displacement between said guide means and said holding means in response to torque applied thereto;
   g) transmission means for transmitting torque from said drive means for producing rotational displacement of said guide means and linear displacement of said holding means;
      said transmission means having a first operating mode wherein torque applied thereto by said drive means in a first direction is transmitted to said guide means for rotating said guide means and said holding means in said first direction of rotation about said central longitudinal axis of said guide means;
      said transmission means having a second operating mode wherein torque applied thereto by said drive means in a second direction is transmitted to said linear displacement means for producing forward linear displacement of said holding means relative said guide means; and
      said transmission means having a third operating mode wherein torque applied thereto by said drive means in said first direction is transmitted to said linear displacement means for producing rearward linear displacement of said holding means relative said guide means;
   h) projection means projecting rearwardly from said guide means rear end for coacting with a latch means, said projection means being moved in a circular travel path by rotation of said guide means;
   i) plunger means operatively associated with said optical disk holding means and projectable relative said rear end of said guide means for coacting with said latch means, said plunger means having a rearwardly extended position and a forwardly retracted position;
   j) latch means mounted on said base means for engaging said projection means during rotation of said guide means in said first direction of rotation for terminating rotation of said guide means and for restraining said guide means from further rotation in said first direction and said second direction and for coacting with said plunger means for disengaging said projection means from said latch means for enabling rotation of said guide means in said first direction of rotation; and
   k) restraining means operatively associated with said holding means for restraining linear displacement thereof.

39. The invention of claim 38 further comprising:
drive means displacement sensing control means for terminating the driving torque and for reversing the direction of the driving torque provided by said drive means in response to said drive means being angularly displaced by a predetermined amount from an immediately previous stopped position.

40. The invention of claim 38, said latch means comprising:
a first deflectable member means for engaging said projection means during rotation of said guide means in said first direction for terminating said rotation in said first direction and for restraining further rotation in said first rotation direction.

41. The invention of claim 40, said first deflectable member means comprising:
a first surface portion adapted to engage said projection means and having a first operating position wherein said first surface portion thereof is positioned in intersecting relationship with said projection means circular travel path;
a second operating position wherein said first surface portion thereof is positioned in displaced relationship with said projection means circular travel path; and
said first deflectable member means being biased in said first operating position and being deflectable into said second operating position through application of force thereto by said plunger means.

42. The invention of claim 41 wherein said first deflectable member means comprises a first pivotable member having a first pivot axis.

43. The invention of claim 42 wherein said first pivot axis extends transversely of said central longitudinal axis of said guide means.

44. The invention of claim 43 wherein said first engagement surface of said first deflectable member means is positioned relatively forwardly in said first operating position thereof and is positioned relatively rearwardly in said second operating position thereof.

45. The invention of claim 40 wherein said latch means comprises a force transmission member means for transmitting force from said plunger means to said first deflectable member means for moving said first deflectable member means from said first operating position thereof to said second operating position thereof.

46. The invention of claim 45 wherein said force transmission member means comprises a first end attached to said first deflectable member means and a second end having a first surface portion adapted to engage said plunger means during circular movement thereof and a second surface portion adapted to engage said plunger means during axial movement thereof.

47. The invention of claim 46 wherein said force transmission member means comprises a first operating position relative said first deflectable member means and a second operating position relative said first deflectable member means;
said force transmission member means being adapted to transmit axial force from said plunger means to said first deflectable member means when said force transmission member means is in said first operating position.

48. The invention of claim 47 wherein said force transmission member means is biased in said first operating position and is deflectable from said first position to said second position through application of generally circumferentially directed force to said first surface portion thereof by said plunger means through rotation of said guide means in said first direction of rotation 49. The invention of claim 48 wherein said force transmission member is pivotally attached to said first deflectable member about a transmission member pivot axis.

50. The invention of claim 49 wherein said force transmission member pivot axis extends transversely of said plunger means.

51. The invention of claim 40 wherein said latch means comprises a second deflectable member means for engaging said projection means during engagement of said projection means by said first deflectable member means for restraining rotation of said guide means in said second rotation direction.

52. The invention of claim 51 wherein said second deflectable member means comprises:
a first surface portion adapted to yieldingly engage said projection means prior to engagement of said projection means with said first deflectable member means; and
a second surface portion adapted to nonyieldingly engage said projection means during engagement of said projection means with said first deflectable member means.

53. The invention of claim 52 wherein said second deflectable member means comprises:
a first operating position wherein said first surface portion and said second surface portion thereof intersect said circular travel path of said projection means;
a second operating position wherein said first surface portion and said second surface portion thereof are displaced from said circular travel path of said projection means;
a third operating position intermediate said first operating position and said second operating position wherein said second surface portion is positioned in engaged relationship with said projection means and said projection means is position in engaged relationship with said first deflectable member means;
said second deflectable member means being biased in said first operating position and being deflectable from said first operating position to said second operating position through force applied to said first surface portion of said second deflectable member means by said projection means; and
said second deflectable member means being biasingly returnable from said second operating position to said third operating position during the engagement of said projection means and said first deflectable member means and being biasingly returnable from said third operating position to said first operating position subsequent to the disengagement of said projection means from said first deflectable member means.

54. The invention of claim 53 wherein said second deflectable member means second surface portion comprises a tapering surface adapted to progressively wedgingly engage said projection means during movement of said second deflectable member means from said second operating position to said third operating position whereby said projection means is held in locked, zero-tolerance relationship between said first deflectable member means and said second deflectable member means when said second deflectable member means is in said third operating position.

55. The invention of claim 54 wherein said second deflectable member means comprises a pivotal member.

56. The invention of claim 55 wherein said second deflectable member comprises a pivot axis extending parallel to said central axis of rotation of said guide means.

57. An optical disk handling apparatus for producing controlled linear and rotational displacement of an optical disk received therein in response to torque provided by a single drive motor comprising:
a) rotating means for flippingly rotating said optical disk about a rotating means rotation axis;
b) latch engaging means mounted on said rotating means for coacting with a latch means;
c) latch means for engaging said latch engaging means for terminating rotation of said rotating means and for holding said rotating means in at least two different registration positions during said engagement with said latch engagement means; and
d) trip means operatively associated with said latch means for tripping said latch means for unlatching said latch means from engagement with said latch engaging means.

58. The invention of claim 57, comprising:
axial displacement means operatively associated with said rotating means for producing relative axial displacement of said optical disk relative said rotating means.

59. The invention of claim 58, said trip means being operatively associated with said axial displacement means.

60. The invention of claim 59 further comprising transmission means for continuously providing torque to both said rotating means and said axial displacement means for producing rotation of said rotating means and for producing relative axial displacement of said axial displacement means.

61. The invention of claim 60, said apparatus comprising a rotating operating mode associated with rotation of said optical disk received therein and an axial operating mode associated with axial displacement of said optical disk received therein.

62. The invention of claim 61, said latch engaging means being latchingly engaged with said latch means in said axial operating mode.

63. The invention of claim 62, said latch engaging means being latchingly disengaged from said latch means in said rotating operation mode.

64. The invention of claim 62 comprising stop means fixedly associated with said rotating means for preventing axial displacement of said axial displacement means relative said rotating means beyond a predetermined stop position.

65. The invention of claim 64, said axial displacement means being stoppingly engaged with said stop means during said rotating operating mode.

66. The invention of claim 65, said trip means being trippingly engageable with said latch means through relative axial displacement of said axial displacement means toward said stop means.

67. The invention of claim 66, said trip means being nontrippingly engageable with said latch means through relative rotation of said rotating means.

* * * * *